United States Patent
Shivalinga et al.

(10) Patent No.: US 12,024,294 B2
(45) Date of Patent: Jul. 2, 2024

(54) PASSENGER TO FREIGHTER CONVERSION WITH EXTENDABLE ARMREST ASSEMBLY

(71) Applicant: Goodrich Corporation, Charlotte, NC (US)

(72) Inventors: Vinod Kumar Shivalinga, Bangalore (IN); Prateek Avaragolla Renukaprasanna, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 114 days.

(21) Appl. No.: 17/841,497

(22) Filed: Jun. 15, 2022

(65) Prior Publication Data

US 2023/0120497 A1    Apr. 20, 2023

(30) Foreign Application Priority Data

Oct. 14, 2021    (IN) .............................. 202141046886

(51) Int. Cl.
*B64D 11/06*    (2006.01)
*B64C 1/20*    (2006.01)

(52) U.S. Cl.
CPC ............ *B64D 11/0639* (2014.12); *B64C 1/20* (2013.01); *B64D 11/064* (2014.12); *B64D 11/0644* (2014.12)

(58) Field of Classification Search
CPC .............. B64D 11/064; B64D 11/0641; B64D 11/0644; B64D 11/0696; B64D 11/0601; B64D 11/0639; B64D 9/003; B64D 9/00; B64C 1/20
See application file for complete search history.

(56) References Cited

U.S. PATENT DOCUMENTS

| | | | |
|---|---|---|---|
| 3,381,921 A | 5/1968 | McDonough et al. | |
| 6,648,392 B2 * | 11/2003 | Fourrey | B60N 2/3093 296/65.09 |
| 8,333,432 B2 * | 12/2012 | Cone | B60N 2/753 297/411.32 |
| 9,511,847 B2 | 12/2016 | Ehlers et al. | |

(Continued)

FOREIGN PATENT DOCUMENTS

| | | | | |
|---|---|---|---|---|
| CN | 104473479 A * | 4/2015 | ............... | A47C 1/12 |
| DE | 102005006977 A1 * | 8/2006 | ............. | B60N 2/464 |

*Primary Examiner* — Benjamin P Lee
(74) *Attorney, Agent, or Firm* — SNELL & WILMER L.L.P.

(57) ABSTRACT

An armrest assembly for a passenger seat is disclosed. The armrest assembly may be disposed in a stowed, collapsed or passenger configuration where the armrest assembly is of a first length, and also may be disposed in an extended or cargo configuration where the armrest assembly is of a second length that is greater than the first length. Such an armrest assembly may be used to convert all or a portion of a passenger compartment (e.g., of an aircraft) to a cargo compartment by disposing a plurality of armrest assemblies in their respective extended/cargo configuration. Any appropriate cargo may be disposed on/supported by one or more armrest assemblies in their extended/cargo configuration. A free distal end or distal end portion of each armrest assembly in its extended configuration may be anchored to/supported by an appropriate structure, such as an adjacent passenger seat or a bracket(s) attached to a wall.

16 Claims, 26 Drawing Sheets

(56) References Cited

U.S. PATENT DOCUMENTS

| | | | |
|---|---|---|---|
| 10,723,462 B2 | 7/2020 | Ehlers et al. | |
| 11,459,109 B2 * | 10/2022 | Hoover | B64D 11/0644 |
| 11,498,685 B2 * | 11/2022 | Hoover | B64D 11/0689 |
| 11,511,862 B2 * | 11/2022 | Marutzky | B60N 2/77 |
| 11,618,360 B2 * | 4/2023 | Artus | B60N 2/787 |
| | | | 297/411.32 |
| 2014/0183920 A1 * | 7/2014 | Hage-Hassan | B60N 2/20 |
| | | | 297/378.1 |
| 2014/0312662 A1 * | 10/2014 | Erk | B64D 11/06 |
| | | | 297/354.11 |
| 2021/0269161 A1 * | 9/2021 | Hoover | B64D 11/0689 |
| 2021/0269162 A1 * | 9/2021 | Hoover | B64D 11/0644 |
| 2022/0112027 A1 * | 4/2022 | Melton | B64D 11/003 |
| 2022/0242575 A1 * | 8/2022 | Marutzky | B64D 11/064 |
| 2022/0363396 A1 * | 11/2022 | Rowe | B64D 11/0644 |
| 2023/0182904 A1 * | 6/2023 | Colletti | B64D 11/0627 |
| | | | 297/378.1 |

\* cited by examiner

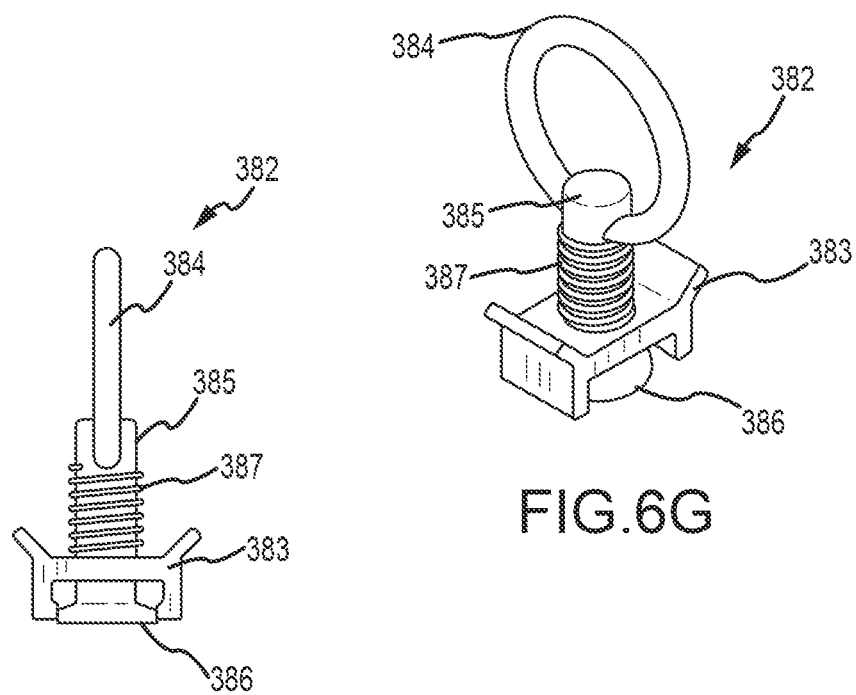
FIG.6G
FIG.6H
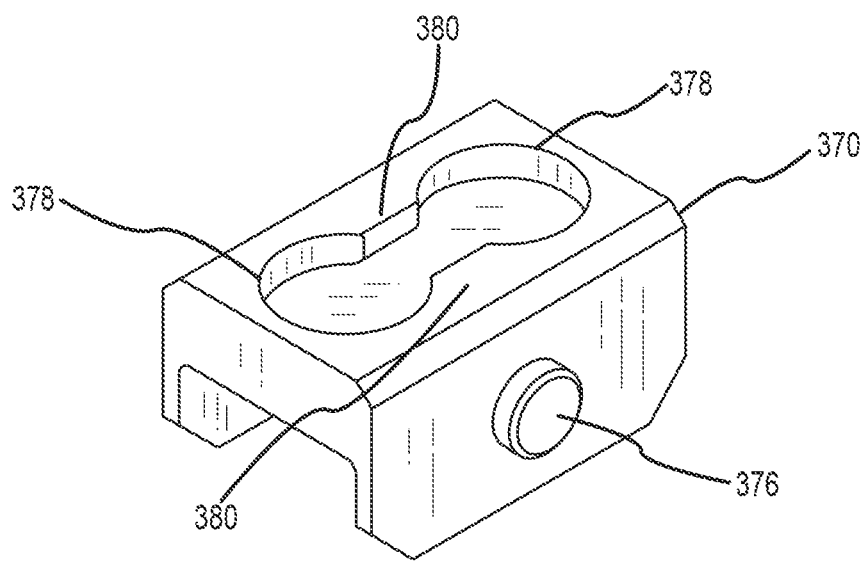
FIG.6F

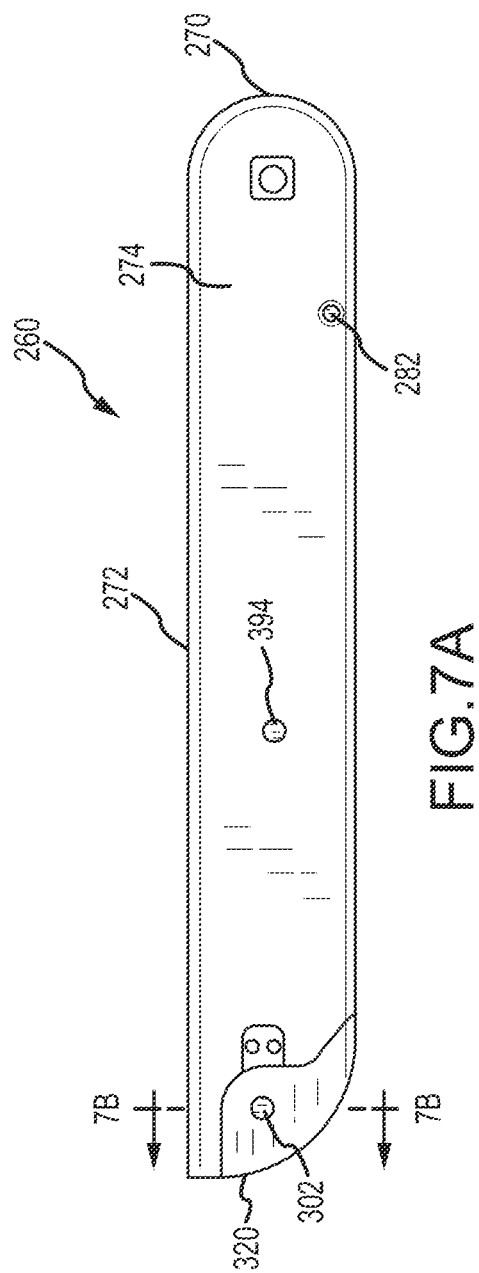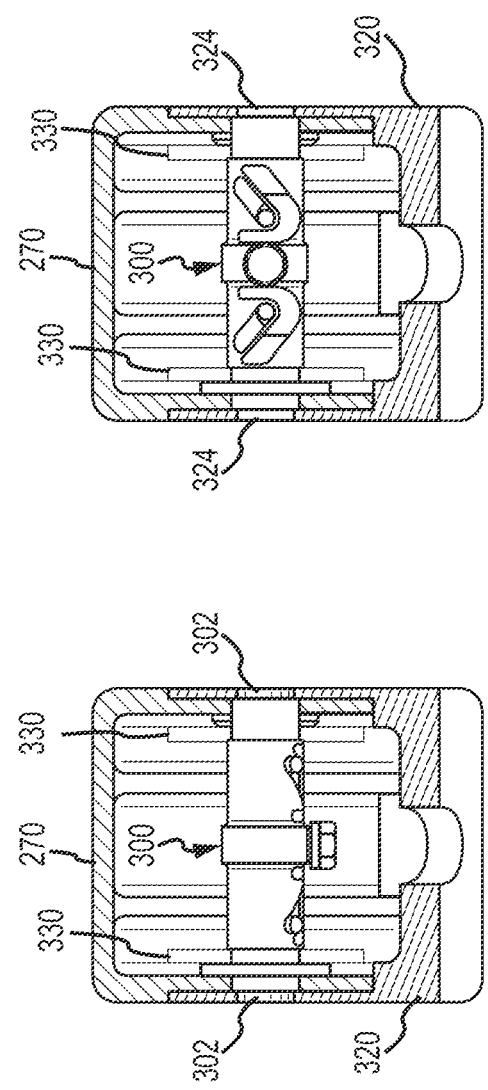

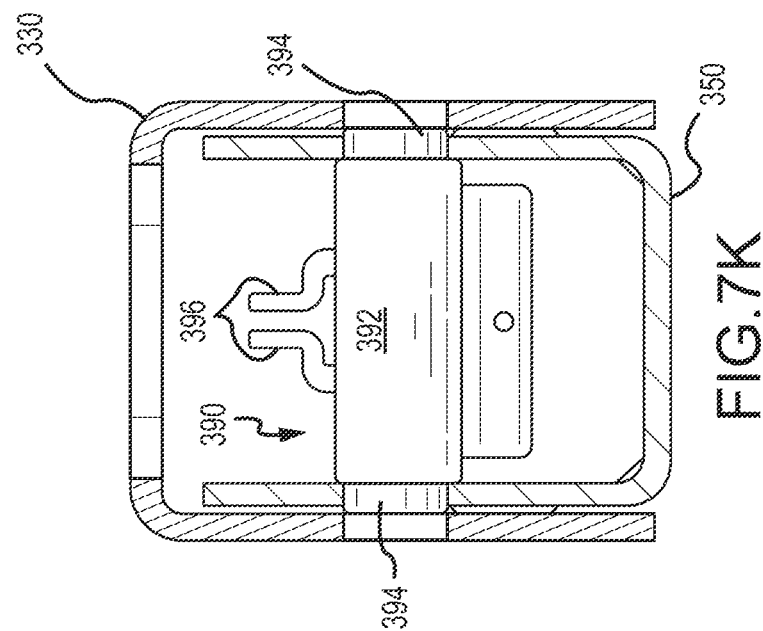
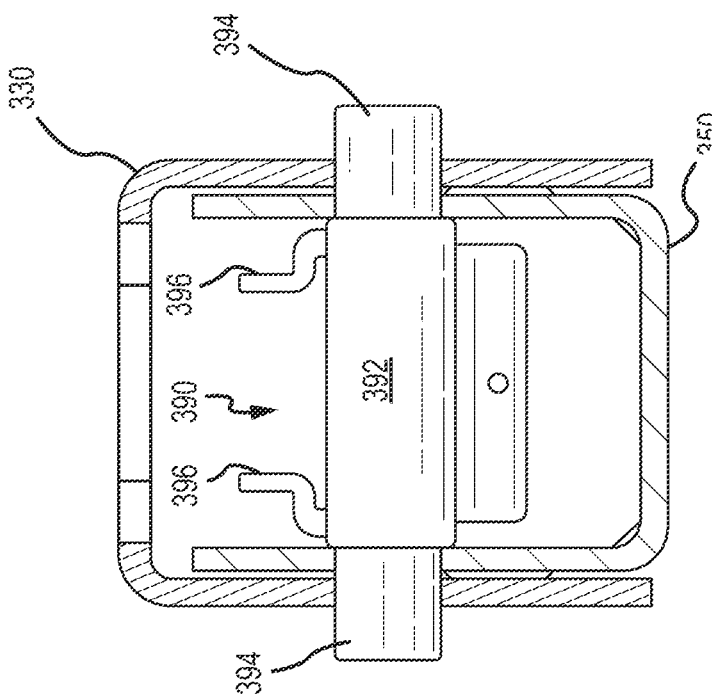

PASSENGER TO FREIGHTER CONVERSION WITH EXTENDABLE ARMREST ASSEMBLY

CROSS-REFERENCE TO RELATED APPLICATIONS

This application claims priority to, and the benefit of, India Patent Application No. 202141046886, filed Oct. 14, 2021 (DAS Code SODA) and titled "PASSENGER TO FREIGHTER CONVERSION WITH EXTENDABLE ARMREST ASSEMBLY," which is incorporated by reference herein in its entirety for all purposes.

FIELD

The present disclosure generally relates to cargo transportation and, more particularly, to converting an aircraft passenger compartment to a cargo compartment.

BACKGROUND

A typical commercial passenger aircraft includes an upper passenger compartment and a lower cargo compartment. Due to the pandemic situation, there are currently fewer passengers using air transport. So, many airlines are converting passenger compartments to cargo compartments, in effect converting a passenger aircraft to a freighter aircraft.

In some cases to convert a passenger compartment into a cargo compartment, all the passenger seats are removed from the compartment to maximize the volume of cargo that can be carried. This method consumes a lot of time and effort to convert a passenger compartment to a cargo compartment, and vice versa. Also, the seats and its interfaces can be damaged if changed repeatedly. In order to avoid this laborious process, a few of the airlines retain the seats and use the passenger compartment to carry small size cargo that can be easily placed on the seats. With this method the cargo capacity of the passenger compartment is not fully utilized, and it will take longer time for loading and unloading on each seat. Also, since the cargo is placed on the seats, the cargo could damage the seat cushion or the seat in general. This cargo-carrying alternative could also damage the in-flight entertainment system (during flight or handling), which could potentially increase maintenance costs if the passenger compartment is regularly used for carrying cargo.

SUMMARY

An armrest assembly for a passenger seat is presented herein. The configuration of such an armrest assembly, the operational characteristics/operation of such an armrest assembly, and the incorporation of such an armrest assembly with a passenger seat are all within the scope of this Summary.

A first aspect is directed to a passenger seat assembly that includes a seat bottom, a seat back, and a pair of extendable armrest assemblies that are spaced from one another in a dimension corresponding with a width dimension of the seat bottom. The passenger seat assembly may be disposed in each of a first, stowed, or passenger configuration and a second, extended, or cargo configuration. The length (in an axial dimension) of the armrest assembly in the cargo configuration for the passenger seat assembly is greater than the length (in the axial dimension) of the armrest assembly in the passenger configuration for the passenger seat assembly. As such, the noted passenger configuration in relation to the armrest assembly may be referred to as a first axial configuration or a stowed axial configuration. Similarly, the noted cargo configuration in relation to the armrest assembly may be referred to as a second axial configuration or an extended axial configuration.

The passenger configuration for the first aspect may include the seat back being disposable in an at least generally upright position relative to its corresponding seat bottom. The seat back may extend upwardly relative to the seat bottom at any appropriate angle for purposes of the passenger configuration. In the cargo configuration for the passenger seat assembly, the seat back may be disposed in an at least generally prone position (at least more horizontally disposed compared to when in the passenger configuration), including where the seat back is disposed in overlying relation to the seat bottom, although such may not be required in all instances for the cargo configuration. An extended armrest assembly may be disposed above and in vertically spaced relation to the seat back for the cargo configuration, although such may not be required in all instances for the cargo configuration. In any case, cargo of any appropriate type may be disposed on and/or supported by a plurality of armrest assemblies that are disposed in their extended configurations for purposes of the first aspect. For instance, the armrest assemblies in one or more rows of passenger seats in a passenger compartment of an aircraft may have one or more of their corresponding armrest assemblies disposed in the cargo configuration to support appropriate cargo.

A representative extendable configuration for the armrest assembly includes having the armrest assembly being defined by a plurality of movably interconnected armrest links or members to collectively define a desired length for the armrest assembly in its extended configuration. The armrest assembly could be of a telescoping arrangement to provide an extendable configuration for the cargo configuration of the passenger seat assembly (the extended configuration for such a telescoping arrangement being of a greater length than a collapsed configuration of such a telescoping arrangement). Three pivotally interconnected armrest links may be used for the armrest assembly in various embodiments. A first armrest link may be interconnected with the passenger seat and/or a supporting structure for the passenger seat (e.g., a seat frame); the first armrest link may be pivotally connected with a second armrest link (e.g., a distal end portion of the first armrest link may be pivotally connected with a proximal end portion of the second armrest link); and a third armrest link may be pivotally connected with the second armrest link (e.g., a distal end portion of the second armrest link may be pivotally connected with a proximal portion of the third armrest link). With the armrest assembly in its extended configuration and in various embodiments, the second armrest link may extend distally from the first armrest link and the third armrest link may extend distally from the second armrest link. The armrest assembly may be disposed in a stowed or collapsed configuration for the passenger configuration of the passenger seat assembly, including in various embodiments where the third armrest link is nested with and the second armrest link, and where the second and third armrest links are collectively nested within the first armrest link.

The cargo configuration for the above-noted passenger seat assembly may further include a distal end or a distal end portion of a given armrest assembly being appropriately supported, such as by engaging an adjacent, forwardly disposed passenger seat or by engaging one or more brackets attached to a wall, such as a bulkhead of an aircraft. The above-noted passenger seat assembly may be incorporated by any appropriate number of passenger seat assemblies of any appropriate vehicle, including a bus, an aircraft, or the like—the vehicle may be of any appropriate size, shape, configuration, and/or type. Such a passenger seat assembly allows at least part of a passenger area/compartment of a vehicle to be converted to a cargo area/compartment, which may be beneficial in at least certain circumstances (e.g., when there is reduced ridership).

Various aspects of the present disclosure are also addressed by the following paragraphs and in the noted combinations:

1. A passenger seat assembly, comprising:
   a seat bottom;
   a seat back movable relative to said seat bottom;
   a pair of armrest assemblies that are spaced from another in a dimension corresponding with a width of said seat bottom, each said armrest assembly comprising:
     a first armrest link; and
     a second armrest link movably connected to said first armrest link;
   a first configuration comprising:
     said seat back being disposed in an at least generally upright position relative to said seat bottom; and
     said second armrest link of each said armrest assembly being disposed in a stowed position relative to its corresponding said first armrest link; and
   a second configuration comprising:
     said second armrest link of each said armrest assembly extending distally from its corresponding said first armrest link;
   wherein each said armrest assembly is of a first length in said first configuration and is of a second length in said second configuration, with said second length being of a larger magnitude axially than said first length.

2. The passenger seat assembly of paragraph 1, wherein said second armrest link is nested within the corresponding said first armrest link when the corresponding said armrest assembly is disposed in said first configuration.

3. The passenger seat assembly of any of paragraphs 1-2, wherein an upper surface of said second armrest link projects downwardly when the corresponding said armrest assembly is in said first configuration and projects upwardly when the corresponding said armrest assembly is in said second configuration.

4. The passenger seat assembly of any of paragraphs 1-3, wherein said second armrest link is pivotally connected to the corresponding said first armrest link for each said armrest assembly.

5. The passenger seat assembly of any of paragraphs 1-4, wherein each said armrest assembly further comprises:
   a third armrest link movably connected to the corresponding said second armrest link;
   wherein said first configuration further comprises, for each said armrest assembly, said third armrest link being nested within the corresponding said second armrest link and where said second armrest link and said third armrest link are collectively nested within the corresponding said first armrest link; and
   wherein said second configuration further comprises said third armrest link extending distally from the corresponding said second armrest link.

6. The passenger seat assembly of paragraph 5, wherein said third armrest link is pivotally connected to the corresponding said second armrest link for each said armrest assembly.

7. The passenger seat assembly of any of paragraphs 5-6, wherein each said armrest assembly further comprises:
   a bottom cover movably connected with the corresponding said first armrest link; and
   a cover lock movably mounted to the corresponding said first armrest link and detachably engaged with the corresponding said bottom cover to retain the corresponding said armrest assembly in its said first configuration when said cover lock is disposed in a locked configuration.

8. The passenger seat assembly of paragraph 7, wherein, for each said armrest assembly, said cover lock is movable relative to the corresponding said first armrest link to change between said locked configuration and an unlocked configuration for said cover lock.

9. The passenger seat assembly of paragraph 8, wherein said bottom cover for each said armrest assembly encloses the corresponding said second armrest link, the corresponding said third armrest link, and the corresponding said cover lock within the corresponding said first armrest link when said bottom cover is in a closed position.

10. The passenger seat assembly of any of paragraphs 8-9, wherein each said armrest assembly is disposable in said second configuration when its corresponding said bottom cover is in an open position.

11. The passenger seat assembly of any of paragraphs 8-10, wherein said cover lock for each said armrest assembly is rotatable relative to the corresponding said first armrest link to change between said locked configuration and said unlocked configuration for said cover lock.

12. The passenger seat assembly of any of paragraphs 7-11, wherein said bottom cover for each said armrest assembly comprises a tool access through said bottom cover that is aligned with an activation portion of said cover lock.

13. The passenger seat assembly of any of paragraphs 5-12, wherein each said armrest assembly further comprises a link lock mounted to one of the corresponding said second armrest link and the corresponding said third armrest link, and detachably connectable with the other of the corresponding said second armrest link and the corresponding said third armrest link.

14. The passenger seat assembly of paragraph 13, wherein said link lock for each said armrest assembly is disposable in each of a locked position and an unlocked position, wherein said link lock retains the corresponding said third armrest link relative to the corresponding said second armrest link when said link lock is in said locked position, and wherein said link lock releases the corresponding said third armrest link relative to the corresponding said second armrest link when said link lock is in said unlocked position such that the corresponding said armrest assembly may be disposed in said second configuration.

15. The passenger seat assembly of paragraph 14, wherein said link lock for each said armrest assembly further retains the corresponding said first armrest link relative to each of the corresponding said second armrest link and the corresponding said third armrest link when said link lock is in said locked position, and wherein said link lock releases the corresponding said first armrest link relative to each of the corresponding said second armrest link and the corresponding said third armrest link and further releases the corresponding said third armrest link relative to the corresponding said second armrest link when said link lock is in said unlocked position such that the corresponding said armrest assembly may be disposed in said second configuration.
16. The passenger seat assembly of any of paragraphs 14-15, wherein said link lock for each said armrest assembly is mounted to the corresponding said third armrest link and detachably engages at least the corresponding said second armrest link when said link lock is in said locked position.
17. The passenger seat assembly of paragraph 16, wherein, for each said armrest assembly, an upper surface of said second armrest link comprises a link lock access through said second armrest link that is aligned with said link lock.
18. The passenger seat assembly of paragraph 17, wherein, for each said armrest assembly, said upper surface of said second armrest link projects upwardly when the corresponding said armrest assembly is disposed in said second configuration, and wherein said upper surface of said second armrest link projects downwardly when the corresponding said armrest assembly is disposed in said first configuration.
19. The passenger seat assembly of any of paragraphs 14-18, wherein said link lock for each said armrest assembly comprises a retention pin assembly, wherein a pair of retention pins are axially movable toward one another to change said retention pin assembly from said locked position to said unlocked position, and wherein said pair of retention pins are axially movable away from one another to change said retention pin assembly from said unlocked position to said locked position.
20. The passenger seat assembly of any of paragraphs 5-19, wherein each said armrest assembly comprises a cargo tiedown that is accessible when said armrest assembly is in said second configuration.
21. The passenger seat assembly of paragraph 20, wherein said third armrest link of each said armrest assembly comprises said cargo tiedown.
22. The passenger seat assembly of paragraph 21, wherein said cargo tiedown is disposed on an upper surface of said third armrest link and projects upwardly when the corresponding said armrest assembly is disposed in said second configuration.
23. An aircraft comprising the passenger seat assembly of any of paragraphs 1-22, further comprising a second passenger seat assembly disposed in front of and spaced from said passenger seat assembly, wherein a distal end section of each said armrest assembly is detachably anchored to said second passenger seat assembly when said armrest assemblies are in said second configuration.
24. An aircraft comprising the passenger seat assembly of any of paragraphs 1-22, further comprising a wall disposed in front of and spaced from said passenger seat assembly, and at least two brackets fastened to said wall, wherein a distal end section of each said armrest assembly of said passenger seat assembly is detachably anchored to a different one of said brackets when said armrest assemblies are in said second configuration.
25. An armrest assembly for a passenger seat assembly, comprising:
a first armrest link;
a second armrest link movably connected with said first armrest link;
a third armrest link movably connected with said second armrest link;
a first configuration where said third armrest link is nested within said second armrest link and where said second and third armrest links are collectively nested within said first armrest link;
a second configuration where said second armrest link extends distally from said first armrest link and where said third armrest link extends distally from said second armrest link;
wherein said armrest assembly is of a first length in said first configuration and said armrest assembly is of a second length in said second configuration, with said second length being of a larger magnitude axially than said first length.
26. The armrest assembly of paragraph 25, wherein said second armrest link is nested within said first armrest link when said armrest assembly is disposed in said first configuration.
27. The armrest assembly of any of paragraphs 25-26, wherein an upper surface of said second armrest link projects downwardly when said armrest assembly is in said first configuration and projects upwardly when said armrest assembly is in said second configuration.
28. The armrest assembly of any of paragraphs 25-27, wherein said second armrest link is pivotally connected to said first armrest link.
29. The armrest assembly of any of paragraphs 25-28, wherein said third armrest link is pivotally connected to said second armrest link.
30. The armrest assembly of any of paragraphs 25-29, further comprising:
a bottom cover movably connected with said first armrest link; and
a cover lock movably mounted to said first armrest link and detachably engaged with said bottom cover to retain said armrest assembly in said first configuration when said cover lock is disposed in a locked configuration.
31. The armrest assembly of paragraph 30, wherein said cover lock is movable relative to said first armrest link to change between said locked configuration and an unlocked configuration for said cover lock.
32. The armrest assembly of paragraph 31, wherein said bottom cover encloses said second armrest link, said third armrest link, and said cover lock within said first armrest link when said bottom cover is in a closed position.
33. The armrest assembly of any of paragraphs 31-32, wherein said armrest assembly is disposable in said second configuration when said bottom cover is in an open position.
34. The armrest assembly of any of paragraphs 31-33, wherein said cover lock is rotatable relative to said first armrest link to change between said locked configuration and said unlocked configuration for said cover lock.
35. The armrest assembly of any of paragraphs 30-34, wherein said bottom cover comprises a tool access through said bottom cover that is aligned with an activation portion of said cover lock.
36. The armrest assembly of any of paragraphs 25-35, further comprising:
a link lock mounted to one of said second armrest link and said third armrest link, and detachably connectable with the other of said second armrest link and said third armrest link.
37. The armrest assembly of paragraph 36, wherein said link lock is disposable in each of a locked position and an unlocked position, wherein said link lock retains said third armrest link relative to said second armrest link when said link lock is in said locked position, and wherein said link lock releases said third armrest link relative to said second armrest link when said link lock is in said unlocked position such that said armrest assembly may be disposed in said second configuration.
38. The armrest assembly of paragraph 37, wherein said link lock further retains said first armrest link relative to each of said second armrest link and said third armrest link when said link lock is in said locked position, and wherein said link lock releases said first armrest link relative to each of said second armrest link and said third armrest link and further releases said third armrest link relative to said second armrest link when said link lock is in said unlocked position such that said armrest assembly may be disposed in said second configuration.
39. The armrest assembly of any of paragraphs 37-38, wherein said link lock is mounted to said third armrest link and detachably engages at least said second armrest link when said link lock is in said locked position.
40. The armrest assembly of paragraph 39, wherein an upper surface of said second armrest link comprises a link lock access through said second armrest link that is aligned with said link lock.
41. The armrest assembly of paragraph 40, wherein said upper surface of said second armrest link projects upwardly when said armrest assembly is disposed in said second configuration, and wherein said upper surface of said second armrest link projects downwardly when said armrest assembly is disposed in said first configuration.
42. The armrest assembly of any of paragraphs 37-41, wherein said link lock comprises a retention pin assembly, wherein a pair of retention pins are axially movable toward one another to change said retention pin assembly from said locked position to said unlocked position, and wherein said pair of retention pins are axially movable away from one another to change said retention pin assembly from said unlocked position to said locked position.
43. The armrest assembly of any of paragraphs 25-42, further comprising:
a cargo tiedown that is accessible when said armrest assembly is in said second configuration.
44. The armrest assembly of paragraph 43, wherein said third armrest link of each said armrest assembly comprises said cargo tiedown.
45. The armrest assembly of paragraph 44, wherein said cargo tiedown is disposed on an upper surface of said third armrest link and projects upwardly when said armrest assembly is disposed in said second configuration.
46. A method of converting at least part of a passenger compartment between a first configuration and a second configuration, comprising the steps of:
disposing a plurality of armrest assemblies in a common row of passenger seats configured in said passenger compartment;
extending said plurality of armrest assemblies from a stowed axial configuration to an extended axial configuration, and wherein each armrest assembly of said plurality of armrest assemblies is longer in said extended axial configuration compared to said stowed axial configuration.
47. The method of paragraph 46, wherein said extending for each said armrest assembly comprises pivoting a second armrest link relative to a first armrest link.
48. The method of paragraph 47, wherein for each said armrest assembly, said second armrest link extends distally from said first armrest link for said extended axial configuration.
49. The method of any of paragraphs 47-48, wherein said extending for each said armrest assembly further comprises pivoting a third armrest link relative to said second armrest link.
50. The method of paragraph 49, wherein for each said armrest assembly, said third armrest link extends distally from said second armrest link for said extended axial configuration.
51. The method of any of paragraphs 46-50, wherein each said armrest assembly comprises a plurality of armrest links, wherein each adjacent pair of armrest links are pivotally connected, and wherein each adjacent pair of armrest links are pivoted in a common direction for said extending of the corresponding said armrest assembly to said extended axial configuration.
52. The method of paragraph 51, wherein said plurality of armrest links for each said armrest assembly are nested together prior to said extending of the corresponding said armrest assembly to said extended axial configuration.
53. The method of any of paragraphs 51-52, wherein each said armrest assembly comprises a bottom cover, said method further comprising for each said armrest assembly:
pivoting said bottom cover in an opposite direction, compared to said plurality of armrest links of the corresponding said armrest assembly, and into to an open position prior to said extending of the corresponding said armrest assembly to said extended axial configuration.
54. The method of any of paragraphs 46-52, wherein each said armrest assembly comprises a bottom cover, said method further comprising for each said armrest assembly:
moving said bottom cover into an open position prior to said extending of the corresponding said armrest assembly to said extended axial configuration.
55. The method of paragraph 54, wherein said moving said bottom cover comprises requiring a tool to first unlock said bottom cover relative to the corresponding said armrest assembly.
56. The method of any of paragraphs 46-55, further comprising:
supporting a distal end section of each said armrest assembly with an adjacent row of passenger seats.
57. The method of any of paragraphs 46-57, further comprising:
supporting a distal end section of each said armrest assembly with a corresponding bracket attached to a wall.
58. The method of any of paragraphs 46-57, wherein said plurality of armrest assemblies comprises at least three said armrest assemblies.
59. The method of any of paragraphs 46-58, further comprising supporting cargo with said plurality of armrest assemblies in said extended axial configuration.
60. The method of paragraph 59, wherein said cargo comprises a container.

61. The method of paragraph 59, wherein said cargo comprises a patient.

BRIEF DESCRIPTION OF THE DRAWINGS

The subject matter of the present disclosure is particularly pointed out and distinctly claimed in the concluding portion of the specification. An understanding of the present disclosure may be further facilitated by referring to the following detailed description and claims in connection with the following drawings. While the drawings illustrate various embodiments employing the principles described herein, the drawings do not limit the scope of the claims.

FIG. 6F is a perspective, upper view of a tiedown fitting that may be incorporated by the third armrest link of FIG. 6A-6B, in accordance with various embodiments.

FIG. 6G is a perspective view of a representative tiedown assembly that may be used in conjunction with the tiedown fitting shown in FIG. 6F, in accordance with various embodiments.

FIG. 6H is an end view of the tiedown assembly of FIG. 6G, in accordance with various embodiments.

FIG. 7A is a side view of the armrest assembly of FIG. 4A-4B, with the cover being in a closed position, and with the armrest assembly being in the stowed, collapsed, or passenger configuration, in accordance with various embodiments.

FIG. 7B is an internal view (partial cross-section) of the first armrest link and with the cover lock being in the locked configuration, in accordance with various embodiments.

FIG. 7C is an internal view (partial cross-section) of the first armrest link and with the cover lock being in the unlocked configuration, in accordance with various embodiments.

FIG. 7J is a cross-sectional view that shows the link lock in the locked position to lock the second armrest link to the third armrest link for the passenger armrest assembly of FIG. 4A-4C, in accordance with various embodiments.

FIG. 7K is a cross-sectional view that shows the link lock in the unlocked position to release the third armrest link from the second armrest link for the passenger armrest assembly of FIG. 4A-4C, in accordance with various embodiments.

FIG. 7O is a sectional side view of a pin for anchoring a distal end of the passenger armrest assembly of FIG. 4A-4C to another structure, in accordance with various embodiments.

DETAILED DESCRIPTION

Figure 1:
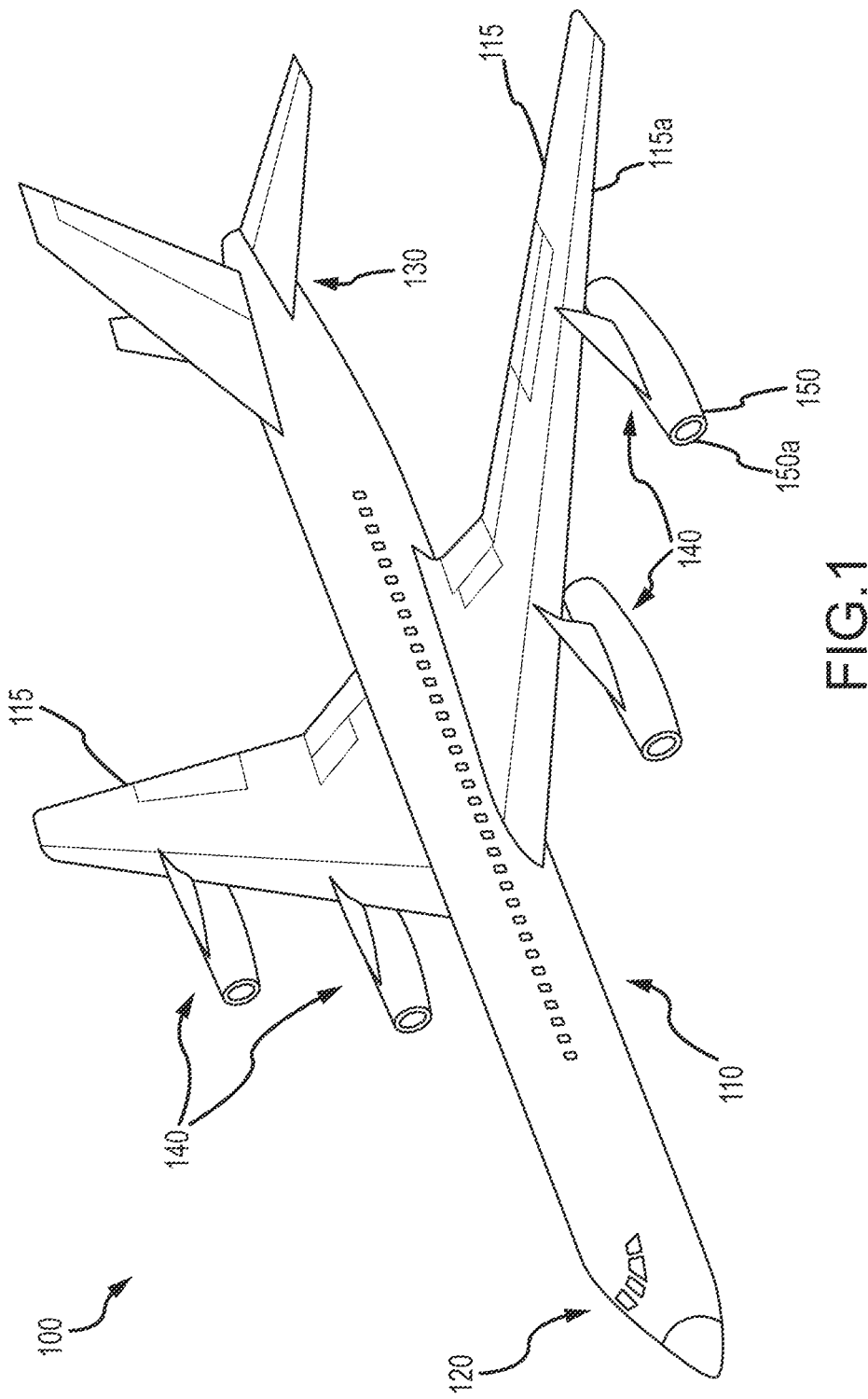
FIG. 1 is a perspective view of a representative aircraft, in accordance with various embodiments.

With reference to FIG. 1, there is illustrated an example aircraft 100. The aircraft 100 includes a fuselage 110 and wings 115. Each wing 115 has a corresponding leading edge 115a (e.g., a "leading" structure/surface of the corresponding wing 115 during movement of the aircraft 100 through the air). The fuselage 110 includes a cockpit 120 and a tailcone 130, which can be substantially integral to the fuselage 110. The aircraft 100 also includes engines 140 which can be affixed to the wings 115 and/or to the fuselage 110, and that may be controlled in any appropriate manner (e.g., by one or more control systems, for example one or more engine control systems). As used herein, the term "engine" is to be understood as including the engines themselves and nacelles 150 which contain the engines. Each nacelle 150 includes a leading edge 150a (e.g., a "leading" structure/surface of the nacelle 150 during movement of the aircraft 100 through the air). Although shown in FIG. 1 generally as a turbofan aircraft in which the engines 140 are gas turbine engines, it should be noted that the aircraft 100 can be any suitable type of aircraft having any suitable number of engines of any suitable type.

Figure 2A:
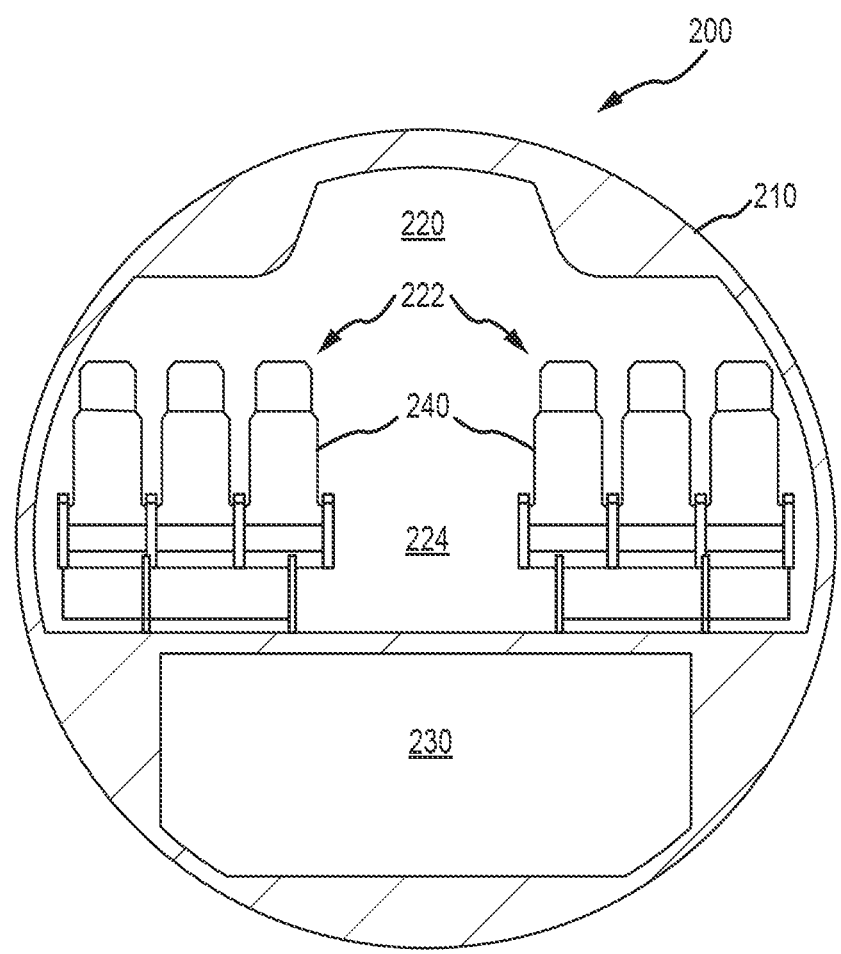
FIG. 2A is a schematic of a representative aircraft including a plurality of passenger seats that each include an extendable armrest assembly, in accordance with various embodiments.

A cross-sectional schematic along a fuselage 210 of an aircraft 200 is illustrated in FIG. 2A. The aircraft 200 may be of any appropriate size, shape, configuration, and/or type. The aircraft 200 includes a passenger compartment 220 and may include a cargo compartment 230 (shown as being positioned below the passenger compartment 220 in FIG. 2A). The passenger compartment 220 may include any appropriate number of seat rows 222 and in any appropriate arrangement. Two seat rows 222 are shown in FIG. 2A and are separated by an aisle 224. Each seat row 222 may include any appropriate number of passenger seats 240 (three passenger seats 240 being shown in FIG. 2A for each of the two seat rows 222). The passenger seats 240 are only schematically shown in FIG. 2A, but that are addressed in more detail herein.

Figure 2B:
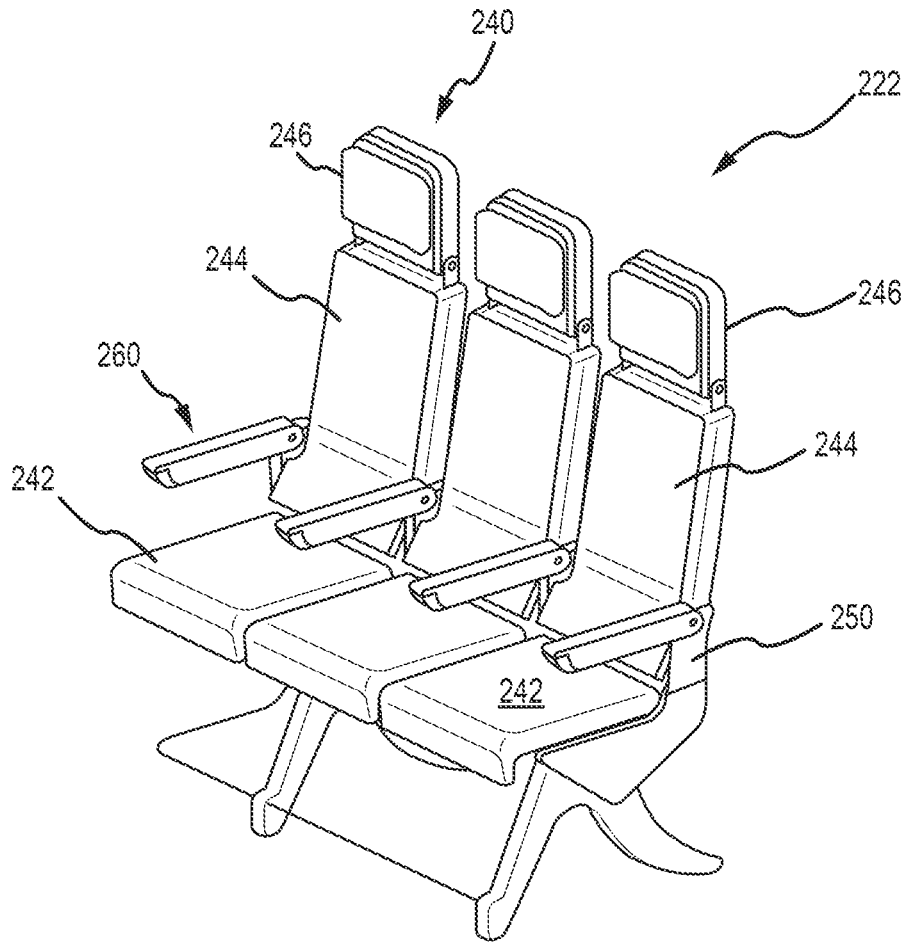
FIG. 2B is a perspective view of a row of passenger seats with extendable armrest assemblies in a stowed, collapsed, or passenger configuration, in accordance with various embodiments.

FIG. 2B illustrates one of the seat rows 222 shown in FIG. 2A. Each passenger seat 240 includes a seat bottom 242, a seat back 244, and a headrest 246. A display 248 may be incorporated on the backside of each headrest 246 for viewing by a passenger in the adjacent, aftly-disposed seat row 222 of the aircraft 200. A pair of armrest assemblies 260 are disposed on each side of each passenger seat 240 in a given seat row 222. Adjacent passenger seats 240 in a given seat row 222 may share a common armrest assembly 260. Each armrest assembly 260 is appropriately interconnected with/mounted to what may be characterized as an armrest frame 250.

Figure 2C:
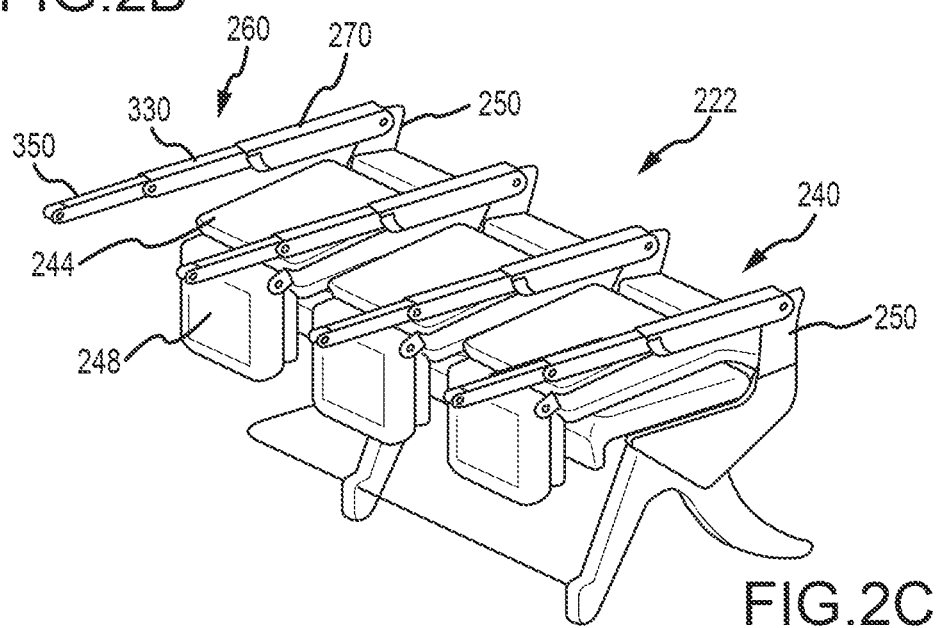
FIG. 2C is a perspective view of a row of passenger seats with extendable armrest assemblies in an extended or cargo configuration, in accordance with various embodiments.

FIG. 2B illustrates the armrest assemblies 260 disposed in what may be characterized as a first configuration, as a passenger configuration, or as a collapsed/stowed configuration. The passenger configuration for a seat assembly including/utilizing a pair of armrest assemblies 260 may include the seat back 244 being disposable in an at least generally upright position relative to its corresponding seat bottom 242 and as shown in FIG. 2B (e.g., the seat back 244 may extend upwardly relative to the seat bottom 242 at any appropriate angle for purposes of the passenger configuration). Each armrest assembly 260 may also be disposed in what may be characterized as a second configuration, a cargo configuration, or as an extended configuration and that is shown in FIG. 2C. Generally, with a distal end or end section of a plurality of armrest assemblies 260 being supported in their cargo or extended configuration, cargo of any appropriate type may be supported by these armrest assemblies 260 for transport by the aircraft 200. As such, all or a portion of a given passenger compartment 220 of the aircraft 200 in effect may be converted into a cargo compartment. The cargo configuration for a seat assembly including/utilizing a pair of armrest assemblies 260 may include the seat back 244 being disposed in an at least generally prone position (at least more horizontally disposed compared to when in the passenger configuration), including where the seat back 244 is disposed in overlying relation to the corresponding seat bottom 242 and as shown in FIG. 2C). However, this "at least generally prone position" for the seat back 244 may be not required for all instances of a cargo configuration, for instance as shown in FIG. 3C).

Figure 3A:
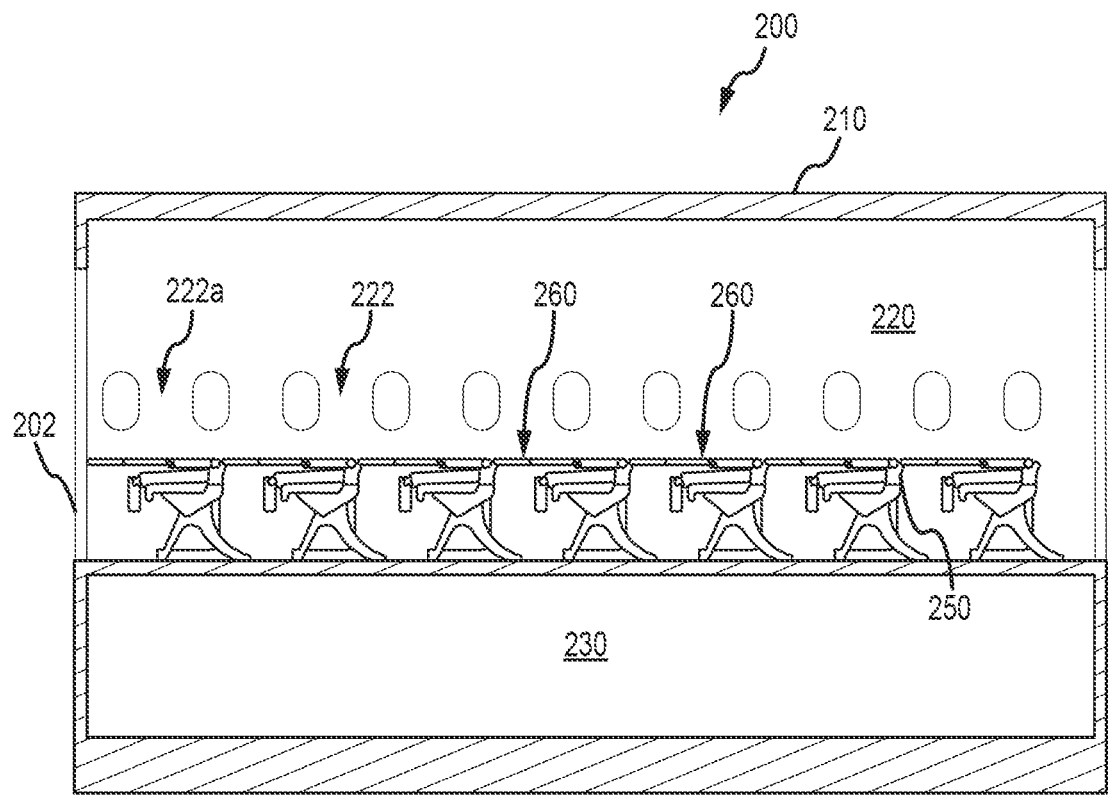
FIG. 3A is a cross-sectional schematic side view of an aircraft and a plurality of rows of passenger seats with extendable armrest assemblies in an extended or cargo configuration, in accordance with various embodiments.

FIG. 3A illustrates a representative configuration of a portion of a passenger compartment 220 that has been converted into a cargo compartment in accordance with the foregoing. Seven seat rows 222 are illustrated in FIG. 3A and with their corresponding armrest assemblies 260 being disposed in the cargo or extended configuration. Each armrest frame 250 may include an armrest mount 252 that is disposed aft of its corresponding armrest assembly 260, and that is used to support a distal end or distal end section of an armrest assembly 260 in the adjacent, aftly-disposed seat row 222 and when its cargo/extended configuration (addressed in more detail below in relation to FIGS. 7P and 7Q). The extended armrest assemblies 260 of a seat row 222 that is adjacent to a wall or bulkhead 202 of the aircraft 200 (seat row 222a in FIG. 3A) may have their corresponding distal end or distal end sections supported by this bulkhead 202 (addressed in more detail below in relation to FIGS. 7R and 7S).

Figure 3B:
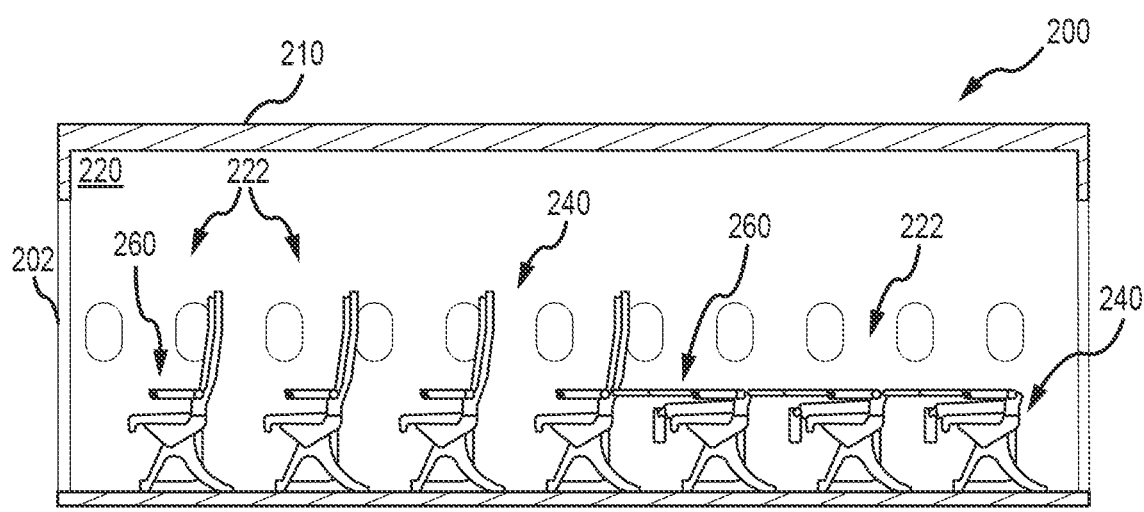
FIG. 3B is a cross-sectional schematic side view of an aircraft and a plurality of rows of passenger seats with extendable armrest assemblies, with some of the rows of passenger seats having their respective armrest assemblies being in a stowed, collapsed, or passenger configuration and with some of the rows of passenger seats having their respective armrest assemblies being in an extended or cargo configuration, in accordance with various embodiments.
Figure 3C:
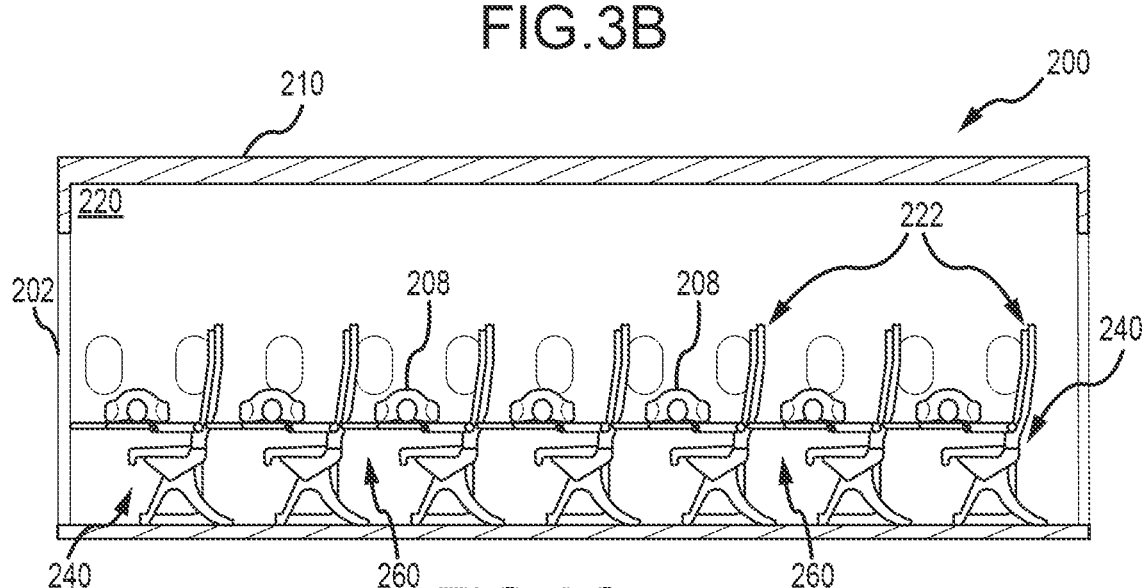
FIG. 3C is a cross-sectional schematic side view of an aircraft with a plurality of rows of passenger seats with extendable armrest assemblies in an extended or patient transport configuration, in accordance with various embodiments.
Figure 3D:
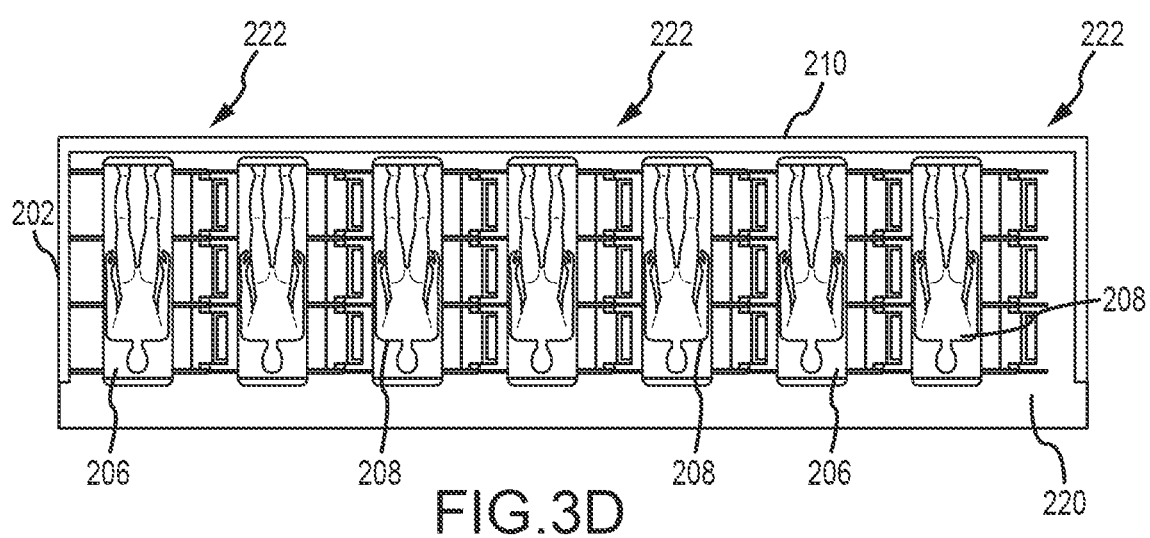
FIG. 3D is a top view of a portion of an aircraft with a plurality of passenger row seats with extendable armrest assemblies in a patient transport configuration, in accordance with various embodiments.

FIG. 3B illustrates a representative configuration of a portion of a passenger compartment 220, where only some of the seat rows 222 have been converted into a cargo compartment in accordance with the foregoing (three such seat rows 222 being shown in a cargo configuration in FIG. 3B). Any appropriate type of cargo may be transported with one or more seat rows 222 being disposed in the cargo configuration. For instance, patients 208 could be transported in a passenger compartment 220 that has been at least partially converted into a cargo compartment, for instance as shown in FIGS. 3C and 3D (e.g., all or a portion of the aircraft 200 could be converted to an air ambulance). A platform 206 could be positioned on the extended armrest assemblies 260 in a given seat row 222 for transport of a patient 208 or for supporting any appropriate container or other cargo and as shown in FIG. 3D.

Figure 4A:
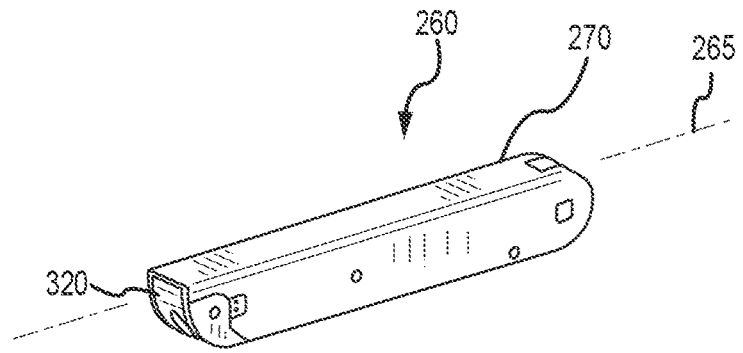
FIG. 4A is a perspective view of a passenger seat armrest assembly in a stowed, collapsed, or passenger configuration, in accordance with various embodiments.
Figure 4B:
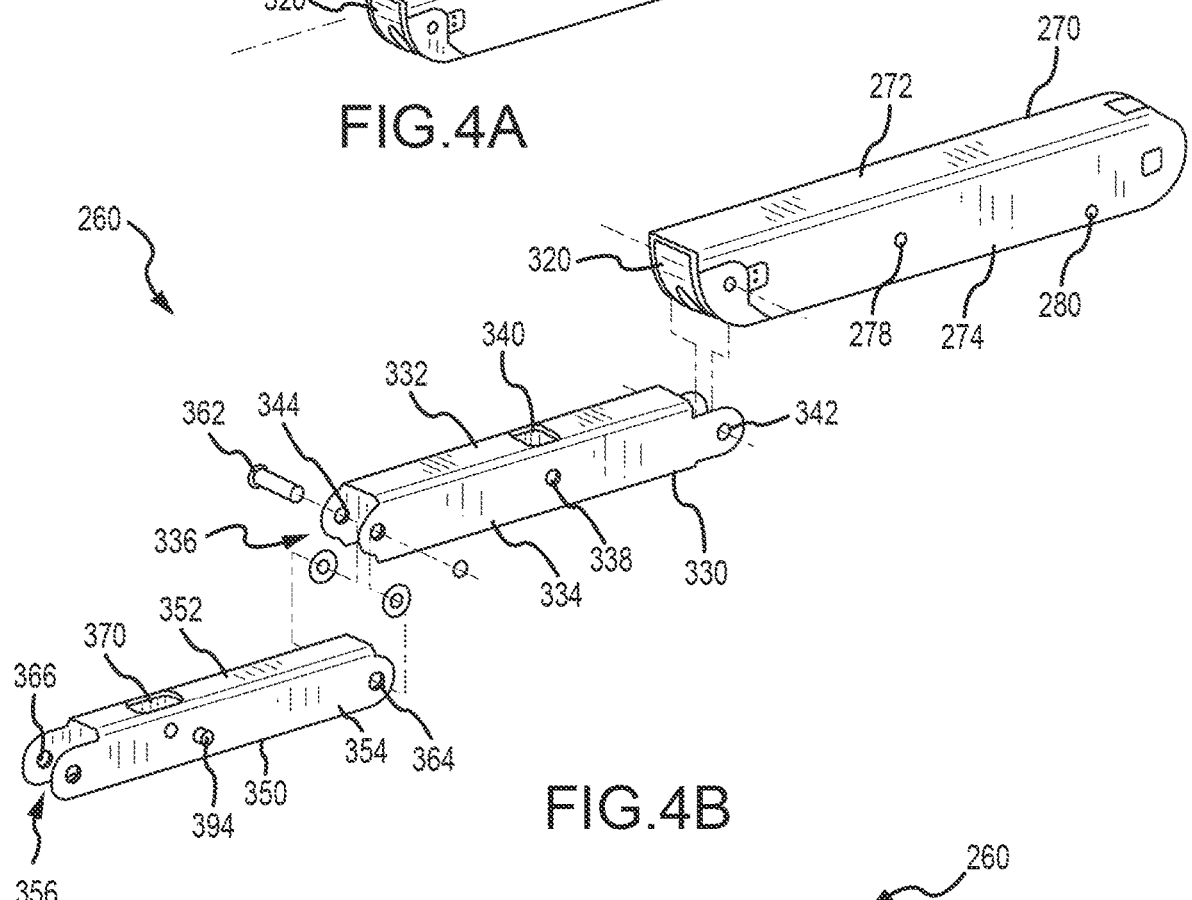
FIG. 4B is an exploded, perspective view of the passenger seat armrest assembly of FIG. 4A, in accordance with various embodiments.
Figure 4C:
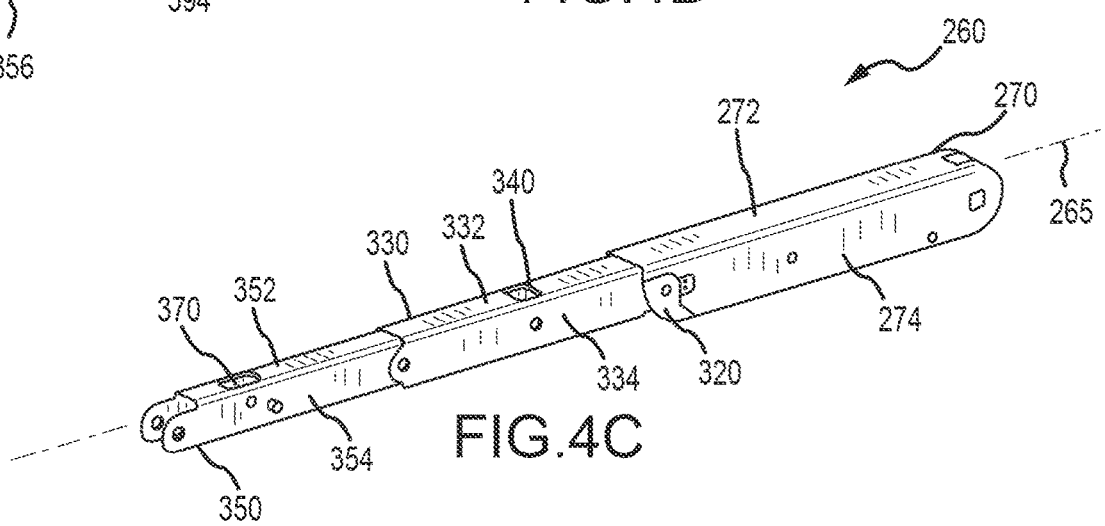
FIG. 4C is a perspective view of the passenger seat armrest assembly of FIG. 4A in an extended or cargo configuration, in accordance with various embodiments.

One of the above-noted armrest assemblies 260 is illustrated in FIG. 4A-4C, with FIG. 4A illustrating the stowed, collapsed, or passenger configuration in relation to the armrest assembly 260 and with FIG. 4C illustrating the extended or cargo configuration in relation to the armrest assembly 260. Each of these two configurations are in relation to an axial dimension (coinciding with a length of the armrest assembly 260). That is, the length dimension of the armrest assembly 260 extends along a longitudinal axis 265 for both the stowed axial configuration of FIG. 4A and the extended axial configuration of FIG. 4C.

The armrest assembly 260 includes a first armrest link 270, a second armrest link 330, a third armrest link 350, and a bottom cover 320. By way of initial summary, the bottom cover 320 may be disposed in the closed position of FIG. 4A to enclose the third armrest link 350 and the second armrest link 330 within the first armrest link 270 (the third armrest link 350 being nested within the second armrest link 330, and with these nested armrest links 350, 330 in turn being nested within the first armrest link 270). A proximal end portion of the second armrest link 330 is pivotally connected with/relative to the first armrest link 270 via mounting apertures 342 and as will be discussed in further detail below, while a distal end portion of the of the second armrest link 330 is pivotally connected with a proximal end portion of the third armrest link 350 via mounting apertures 344 of the second armrest link 330, mounting apertures 364 of the third armrest link 350, and a pivot pin 362 that extends through these mounting apertures 344, 364. A pair of washers may be used in conjunction with the pivot pin 362 to inhibit the sidewalls 334 of the second armrest link 330 and the sidewalls 354 of the third armrest link 350 from touching each other when the third armrest link 350 is extended or when nested in the second armrest link 330.

The second armrest link 330 includes an upper wall 332 and a pair of sidewalls 334 that are disposed in spaced relation to one another, and that each extend from the upper wall 332 (e.g., FIGS. 4B and 4C). The upper wall 332 and the pair of sidewalls 334 of the second armrest link 330 collectively define a hollow interior 336 for receiving the third armrest link 350 for the stowed/collapsed/passenger configuration of the armrest assembly 260. As will be discussed in more detail below, the armrest assembly 260 includes a retention pin assembly or link lock 390 (e.g., FIGS. 6B-6E) for retaining the first armrest link 270, the second armrest link 330, and the third armrest link 350 in a fixed position relative to one another for the stowed/collapsed/passenger configuration of the armrest assembly 260. In this regard, the second armrest link 330 includes a retention pin aperture 338 on each of its sidewalls 334, along with an axis or a pocket 340 on its upper wall 332 for accessing the noted retention pin assembly 390 in a manner that will be addressed in more detail below.

Various details pertaining to at least the first armrest link 270 are further illustrated in FIGS. 5A-5E. The first armrest link 270 includes an upper wall 272 and a pair of sidewalls 274 that are disposed in spaced relation to one another, and that each extend from the upper wall 272. Each of the sidewalls 274 includes a retention pin aperture 278 for the above-noted retention pin assembly 390 (again, for locking the third armrest link 350 within the hollow interior 336 of the second armrest link 330, and for locking the nested links 350, 330 within the hollow interior 276 of the first armrest link 270). The upper wall 272 and the pair of sidewalls 274 of the first armrest link 270 collectively define a hollow interior 276 for receiving the third armrest link 350 and the second armrest link 330 for the stowed/collapsed/passenger configuration of the armrest assembly 260 (again, the third armrest link 350 being nested within the second armrest link 330, and with these nested links 350, 330 in turn being nested within the hollow interior 276 of the first armrest link 270).

The armrest assembly 260 further includes a locking pin assembly or cover lock 300 (e.g., FIGS. 5A-5E) that is mounted to a pair of mounting apertures 286 of the first armrest link 270, using, for instance, a washer 288, plate 290, and rivets 292. The second armrest link 330 may be pivotally mounted to the locking pin assembly 300 to provide a pivotal connection between the first armrest link 270 and the second armrest link 330. The bottom cover 320 is pivotally connected to the first armrest link 270. In this regard, the first armrest link 270 includes a mounting aperture 280 through each of its sidewalls 274.

The bottom cover 320 for the armrest assembly 260 is pivotally connected to the first armrest link 270, and may include a bottom wall 328a and a pair of upwardly-extending sidewalls 328b. These sidewalls 328b may extend into the hollow interior 276 of the first armrest link 270 when the bottom cover 320 is in its closed position. In any case, a pivot pin aperture 322 is provided on a proximal end portion of the bottom cover 320 (e.g., FIG. 5A). A pivot pin 282 extends through this pivot pin aperture 322 and engages the mounting apertures 280 of the first armrest link 270 to pivotally connect the bottom cover 320 with the first armrest link 270 (note that a spring pin 284 may be used to lock the pivot pin 282 in place after passing through the pivot pin apertures 322 of the bottom cover 320 and the mounting apertures 280 of the first armrest link 270, with the pivot pin 282 and cover 320 including a hole 285a, 285b, respectively, for such a spring pin 282). The bottom cover 320 further includes a pair of locking pin apertures 324 through which corresponding portions of the locking pin assembly 300 extend to retain the bottom cover 320 in its closed position (e.g., FIG. 4A), and where the same portions of the locking pin assembly 300 extend into/through the mounting apertures 286 of the first armrest link 270.

The locking pin assembly/cover lock 300 is operable to allow the bottom cover 320 to be changed between a closed position and an open position relative to the first armrest link 270. The locking pin assembly 300 is disposed within the hollow interior 276 at a distal end portion of the first armrest link 270 (e.g., FIG. 5A-5B). The bottom cover 320 includes a tool access or pocket 326 (FIG. 5B) through which an appropriate tool may be directed to change the locking pin assembly 300 from a locked configuration (where the bottom cover 320 is in its closed positioned and is fixed relative to the first armrest link 270—FIG. 4A) and an unlocked configuration (where the bottom cover 320 may be pivoted away from the first armrest link 270—FIG. 7D discussed below). Requiring a tool reduces the potential for other than the appropriate personnel converting at least part of a passenger compartment 220 into a cargo compartment.

Figure 5A:
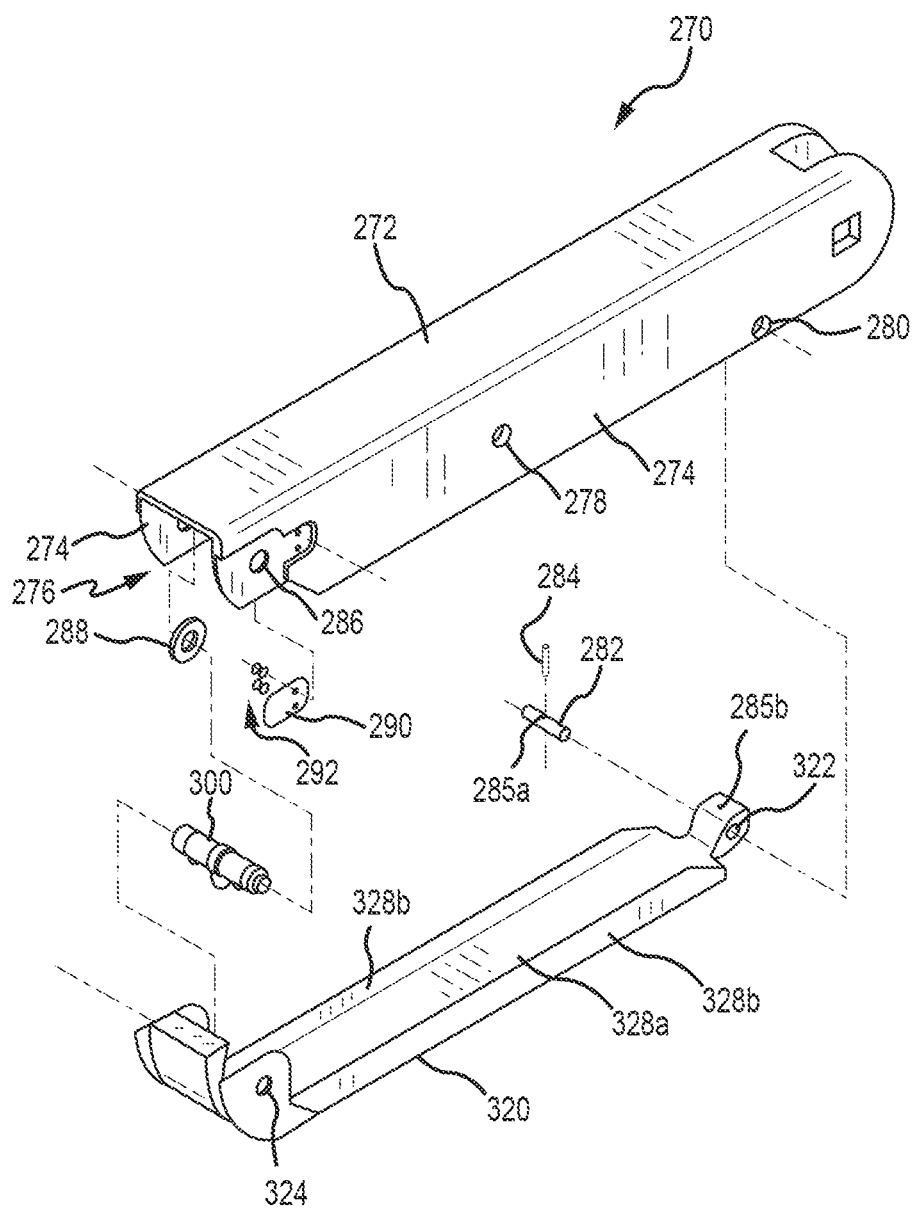
FIG. 5A is an exploded, perspective view of a first armrest link of the armrest assembly of FIG. 4A-4C, in accordance with various embodiments.
Figure 5B:
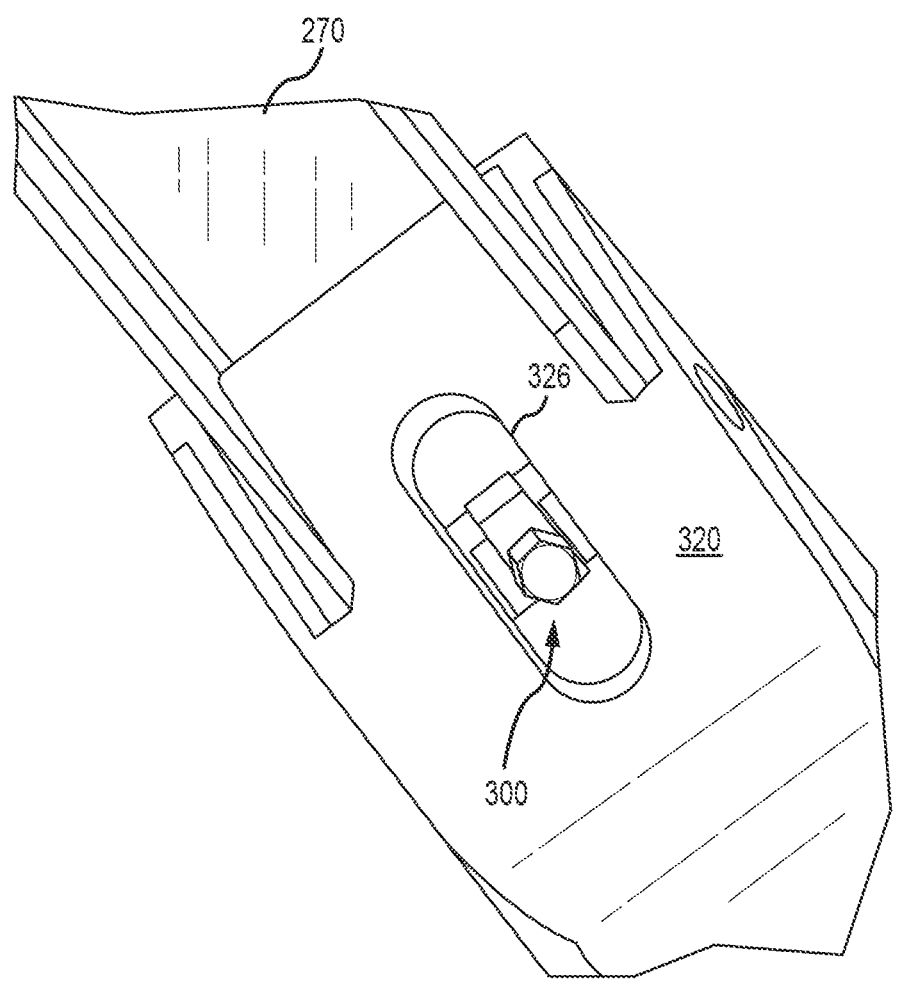
FIG. 5B is a bottom view of a distal portion of the first armrest link of FIG. 5A, and with a cover for the first armrest link being in a closed position, in accordance with various embodiments.
Figure 5C:
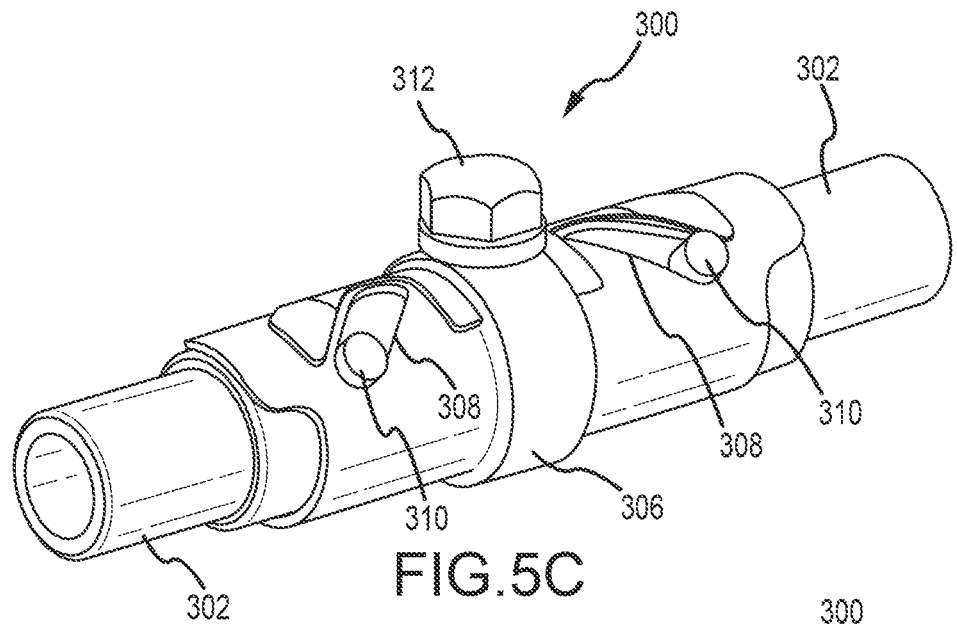
FIG. 5C is a perspective view of a locking pin assembly or cover lock that releasably secures the cover to the first armrest link of FIG. 5A, in accordance with various embodiments.
Figure 5D:
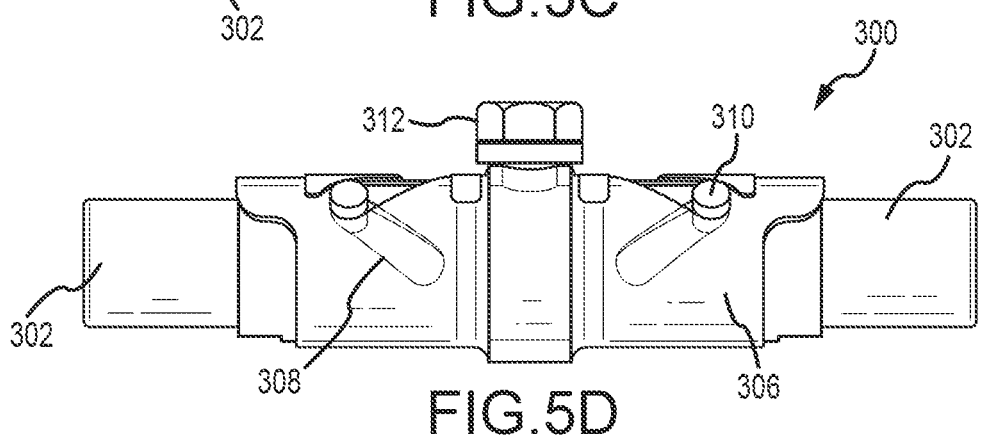
FIG. 5D is a side view of the cover lock of FIG. 5C in a locked configuration, in accordance with various embodiments.
Figure 5E:
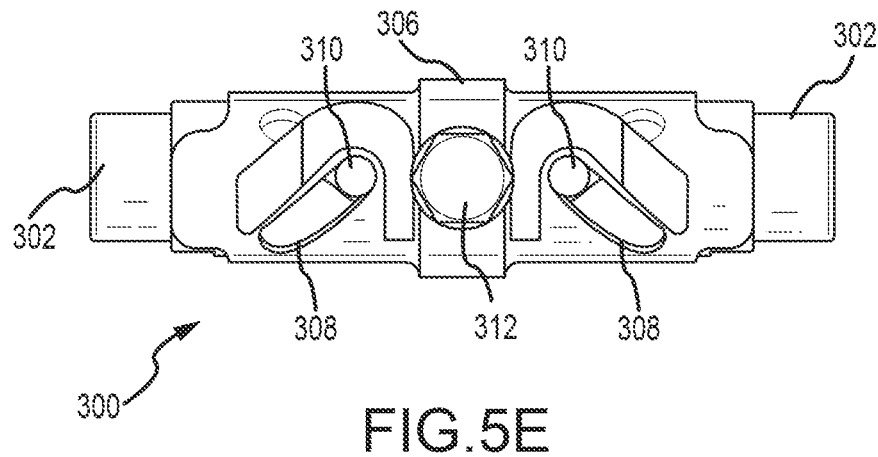
FIG. 5E is a side view of the cover lock of FIG. 5C in an unlocked configuration, in accordance with various embodiments.

The locking pin assembly 300 includes a pair of locking pins 302, a central housing 306 having a pair of camming slots 308, and a pin or follower 310 that is fixed relative to the corresponding locking pin 302 (e.g., each locking pin 302 has its own pin/follower 310). A fastener 312 is engaged (e.g., threadably) with the central housing 306 and is engageable with the locking pins 302 to maintain the central housing 306 in a fixed position relative to each of the locking pins 302. The locked configuration for the locking pin assembly 300 is shown in FIG. 5D, where the pair of locking pins 302 are in an extended position/configuration and extend through the corresponding locking pin aperture 324 of the bottom cover 320 to lock the bottom cover 320 in its closed position relative to the first armrest link 270 (e.g., FIG. 4A). The unlocked configuration for the locking pin assembly 300 is shown in FIG. 5E, where the pair of locking pins 302 have been retracted out the locking pin apertures 324 of the bottom cover 320, to allow the bottom cover 320 to be moved from its closed position (e.g., FIG. 4A) to an open position (e.g., FIG. 7D).

Rotating the central housing 306 relative to the pins 302 (e.g., by engaging the fastener 312 with an appropriate tool) axially moves each of the pins 302 relative to the central housing 306. The pins 302 move away from one another along an axial path in changing from the unlocked configuration to the locked configuration and by one relative rotational motion between the central housing 306 and the locking pins 302. The pins 302 move axially toward one another in changing from the locked configuration to the unlocked configuration and by the opposite relative rotational motion between the central housing 306 and the locking pins 302.

The second armrest link 330 may be pivotally mounted on the locking pins 302 of the locking pin assembly 300 (one of the locking pins 302 extending through the mounting aperture 342 on one of the sidewalls 334 of the second armrest link 330, and the other of the locking pins 302 extending through the mounting aperture 342 on the other of the sidewalls 334 of the second armrest link 330). Loosening the fastener 312 allows the central housing 306 to be rotated relative to the locking pins 302. The interaction between the camming slots 308 and the pins 310 will either extend or retract the locking pins 302, depending upon the relative rotational direction between the central housing 306 and the locking pins 302.

Various details pertaining to at least the third armrest link 350 are further illustrated in FIGS. 6A-6E. The third armrest link 350 includes an upper wall 352 and a pair of sidewalls 354 that are disposed in spaced relation to one another, and that each extend from the upper wall 352. Each of the sidewalls 354 includes a mounting aperture 358 for the above-noted retention pin assembly 390 (again, for locking the third armrest link 350 within the hollow interior 336 of the second armrest link 330, and for locking the nested links 350, 330 within the hollow interior 276 of the first armrest link 270). The upper wall 352 and the pair of sidewalls 354 of the third armrest link 350 collectively define a hollow interior 356.

The noted retention pin assembly 390 is disposed within the hollow interior 356 of the second armrest link 330, and is mounted to the second armrest link 330 via mounting apertures 358 that extend through each of the sidewalls 354 of the third armrest link 350. The retention pin assembly 390 includes a central housing 392 and a pair of retention pins 394 that are axially movable relative to the central housing 392. Each retention pin 394 has a handle 396 fixed thereto and extending therefrom. A spring 398 biases the retention pins 394 away from one another and into the locked position shown in FIGS. 6C and 6D (where each retention pin 394 extends through a corresponding mounting aperture 358 of the third armrest link 350, through a corresponding retention pin aperture 338 of the second armrest link 330, and through a corresponding retention pin aperture 278 of the first armrest link 270, all to retain the first armrest link 270, the second armrest link 330, and a third armrest link 350 in a fixed position relative to one another for the corresponding passenger configuration of FIG. 4A).

Figure 6A:
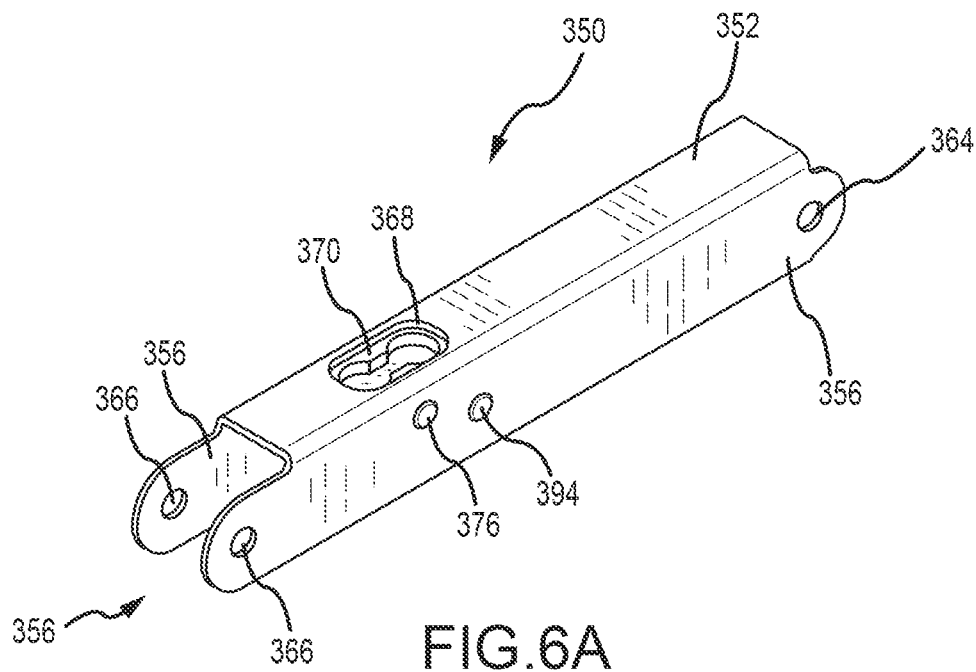
FIG. 6A is a perspective top view of a third armrest link of the armrest assembly of FIG. 4A-4C, in accordance with various embodiments.
Figure 6B:
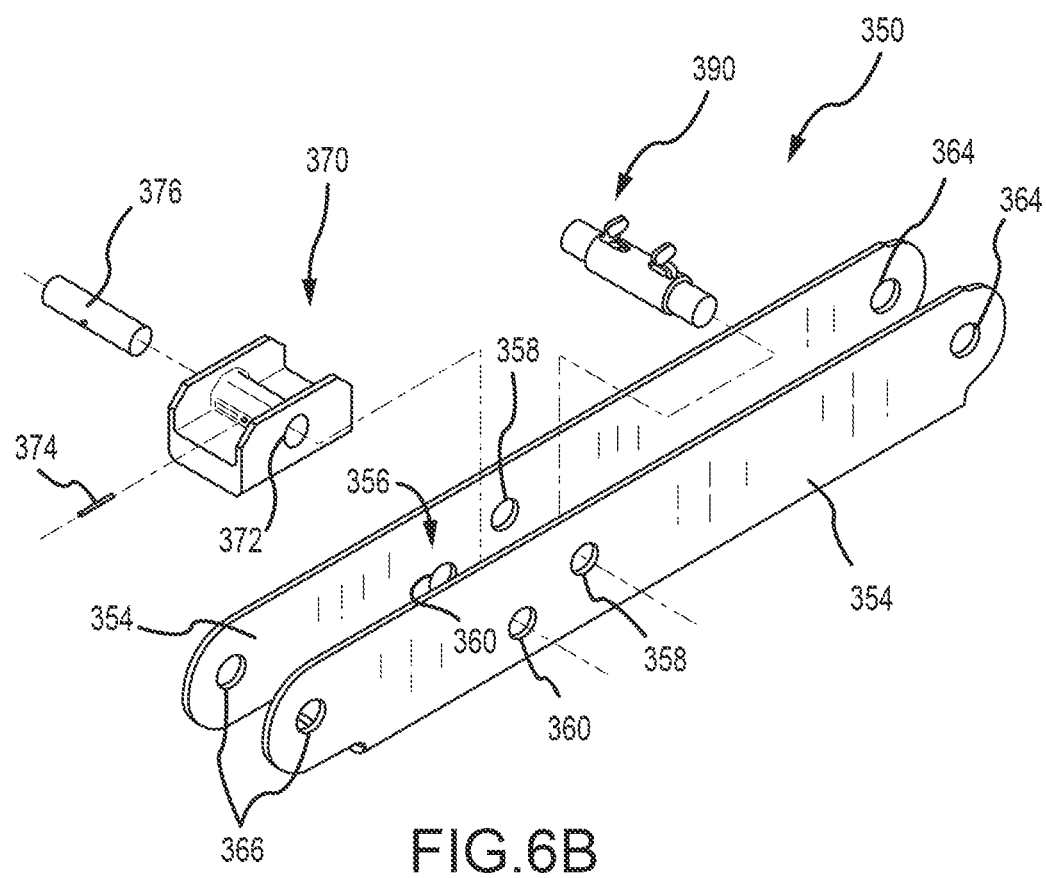
FIG. 6B is an exploded, perspective bottom view of the third armrest link of FIG. 6A, in accordance with various embodiments.
Figure 6C:
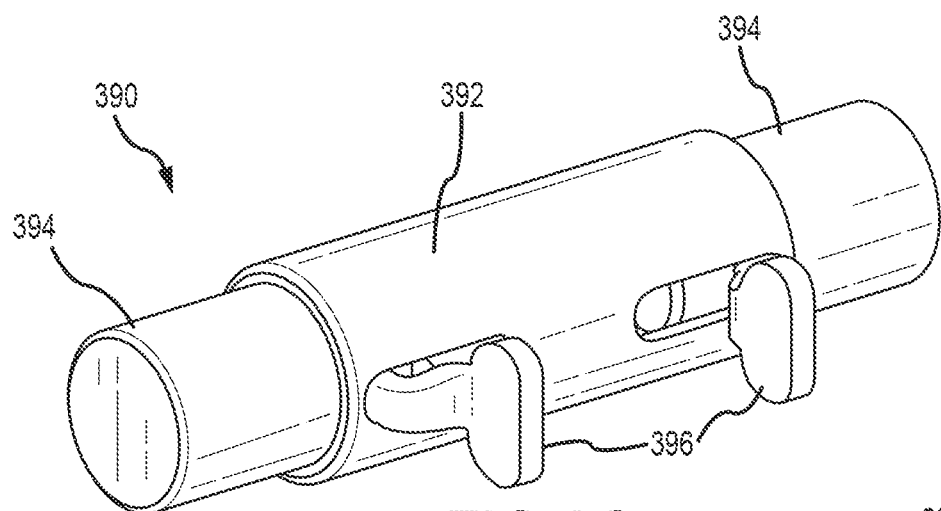
FIG. 6C is a perspective view of a retention pin assembly or link lock that is mounted to the third armrest link of FIG. 6A-6B, and that releasably retains the first armrest link, the second armrest link, and the third armrest link of the armrest assembly of FIG. 4A-4B in the stowed, collapsed, or passenger configuration of FIG. 4A, in accordance with various embodiments.
Figure 6D:
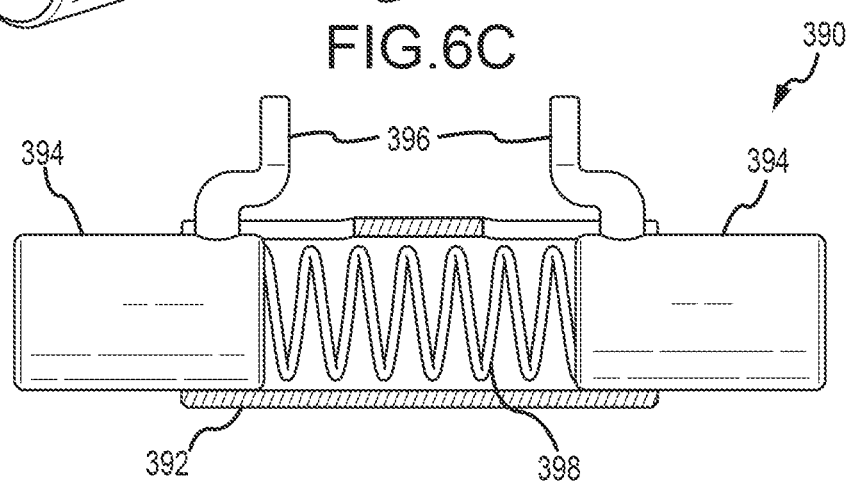
FIG. 6D is a side view of the link lock of FIG. 6C in a locked position, in accordance with various embodiments.
Figure 6E:
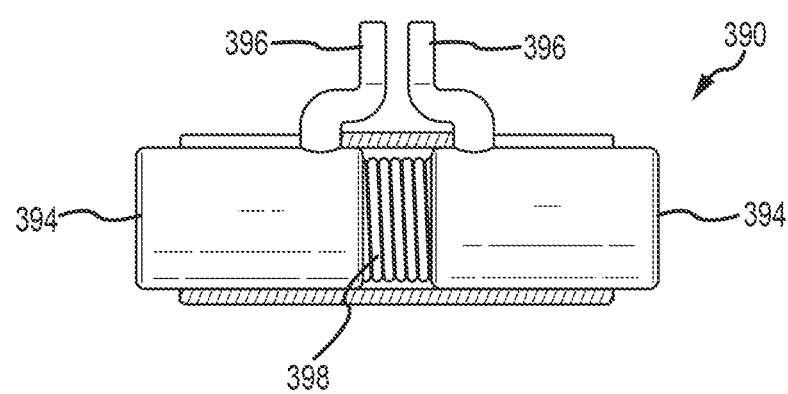
FIG. 6E is a side view of the link lock of FIG. 6C in an unlocked position, in accordance with various embodiments.

A cargo tiedown fitting 370 is illustrated in FIGS. 6A, 6B, and 6F (FIG. 6B showing a bottom view of this cargo tiedown fitting 370, and FIG. 6F showing a top view of this cargo tiedown fitting 370). The cargo tiedown fitting 370 is disposed within the hollow interior 356 of the third armrest link 350, and is mounted to the third armrest link 350 by mounting apertures 360 that extends through the sidewalls 354 of the third armrest link 350, and by a mounting pin 376 that extends through a mounting aperture 372 of the cargo tiedown 370 and at least into each of the noted mounting apertures 360. A spring 374 may engage this mounting pin 376 (e.g., to lock the mounting pin 376 in place, for instance to maintain the structural connection between the cargo tiedown fitting 370 and the third armrest link 350).

The cargo tiedown fitting 370 includes a pair of clearance pockets 378, with a pair of lockdown tabs 380 being disposed therebetween. A tiedown assembly may be disposed within and detachably engage the tiedown fitting 370 to allow cargo to be secured to an extended armrest assembly 260 using a strap, cable, or the like (discussed in more detail below).

A representative tiedown assembly is illustrated in FIGS. 6G and 6H and is identified by reference numeral 382. The tiedown assembly 382 includes a base 383, a ring 384, a pin 385, a head 386, and a spring 387 (the ring 384 and head 386 being disposed on opposite sides of the base 383). A strap, cable, or the like may be secured to the ring 384 when the tiedown assembly 382 is secured to the tiedown fitting 370. The ring 384 is appropriately secured to the pin 385, which extends through the base 383. The head 386 of the pin 385 is disposed below the base 383. The spring 387 biases the ring 384 away from the base 383. The pin 385 may be advanced relative to the base 383 by compression of the spring 387 to dispose the head 386 in one of the clearance pockets 378 of the tiedown fitting 370. The tiedown assembly 382 may then be advanced to dispose the head 386 under the lockdown tabs 380 of the tiedown fitting 370. The pin 385 may then be released, and the spring 387 will dispose the head 386 in engagement with the underside of the lockdown tabs 380 to secure the tiedown assembly 382 relative to the tiedown fitting 370. Again, a strap, cable, or the like may be engaged with the ring 380 for the tiedown assembly 382 to secure cargo to the associated extended armrest assembly 260.

Figure 7D:
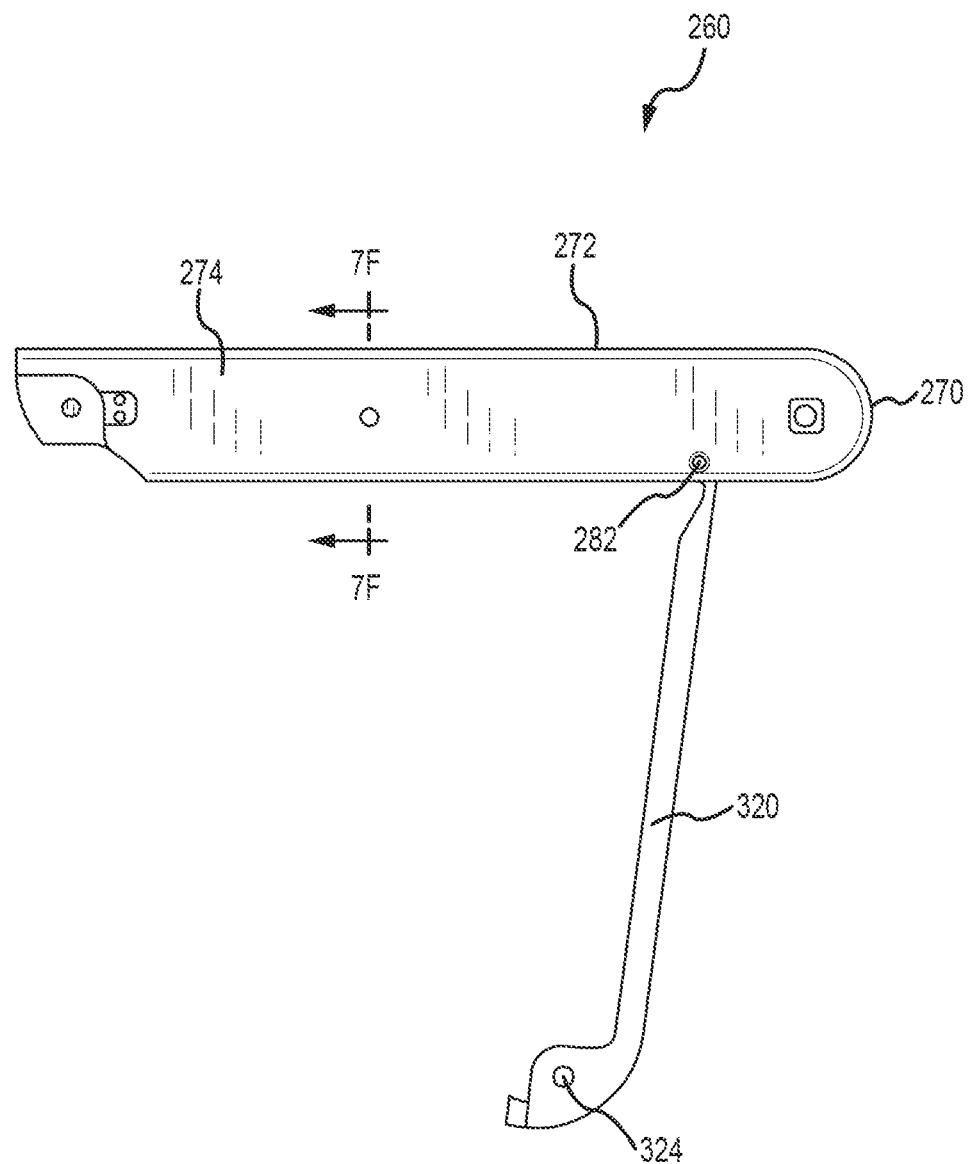
FIG. 7D is a side view of the armrest assembly of FIGS. 4A-4B, with the cover being in an open position, and prior to extending the armrest assembly into the extended or cargo configuration, in accordance with various embodiments.
Figure 7E:
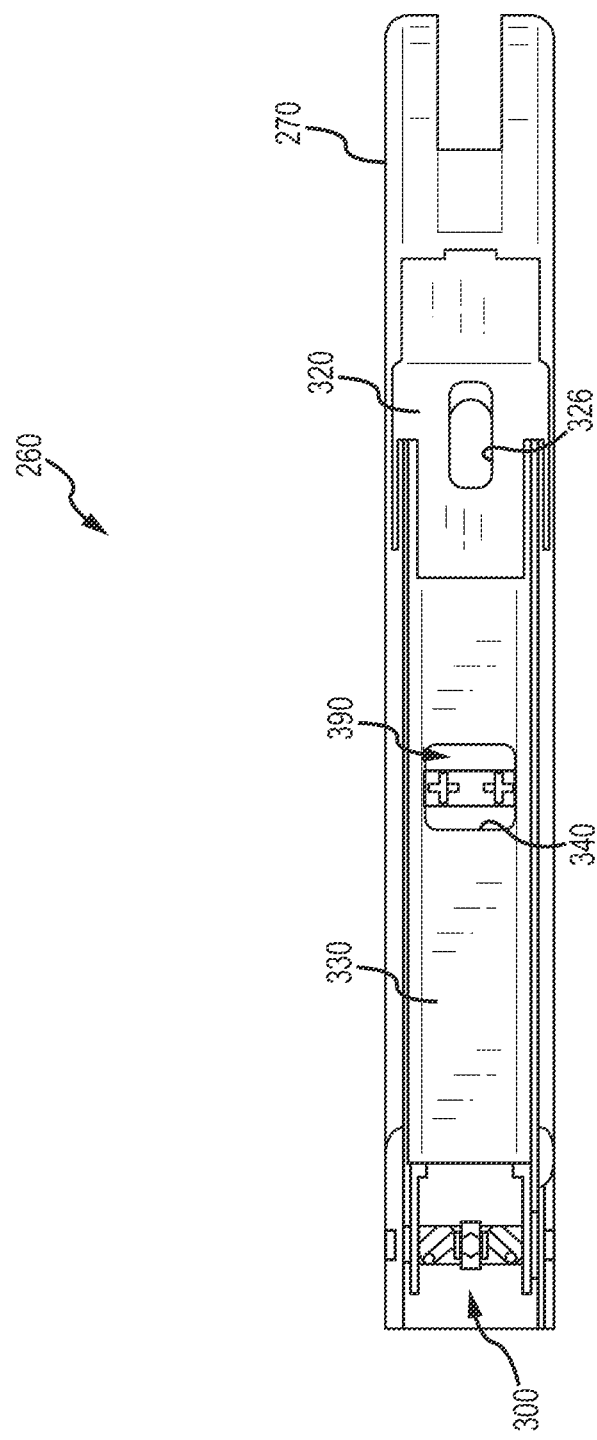
FIG. 7E is a bottom view of the armrest assembly shown in FIG. 7D, in accordance with various embodiments.
Figure 7F:
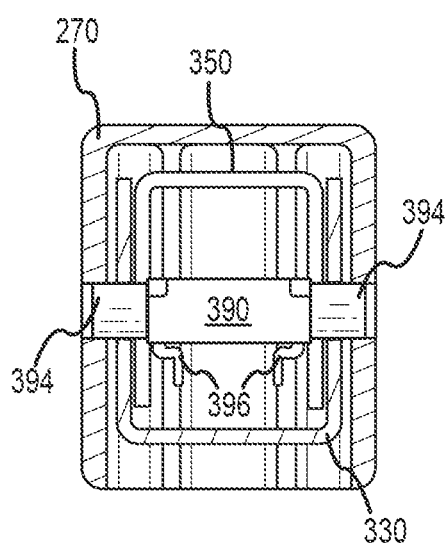
FIG. 7F is a cross-sectional view along line 7F-7F in FIG. 7D and with the link lock being in the locked position, in accordance with various embodiments.
Figure 7G:
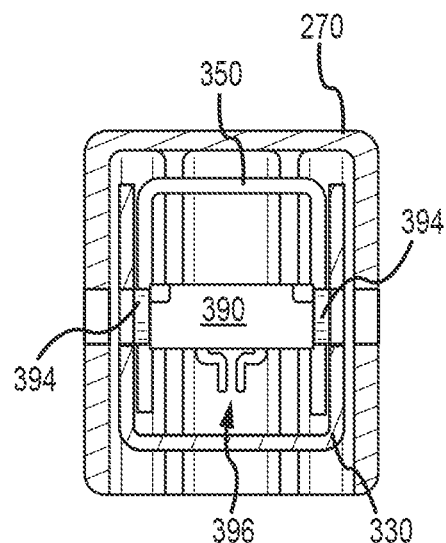
FIG. 7G is the cross-sectional view shown in FIG. 7F, but with the link lock being in the unlocked position for the first armrest link collectively relative to the second armrest link and the third armrest link, in accordance with various embodiments.
Figure 7H:
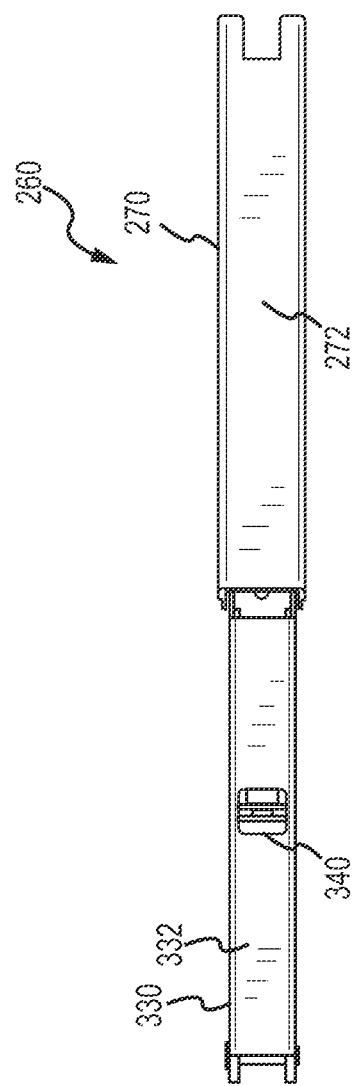
FIG. 7H is a top view of the armrest assembly of FIG. 4A-4B, with the second armrest link and third armrest link having been collectively pivoted out from within the first armrest link, in accordance with various embodiments.
Figure 7I:
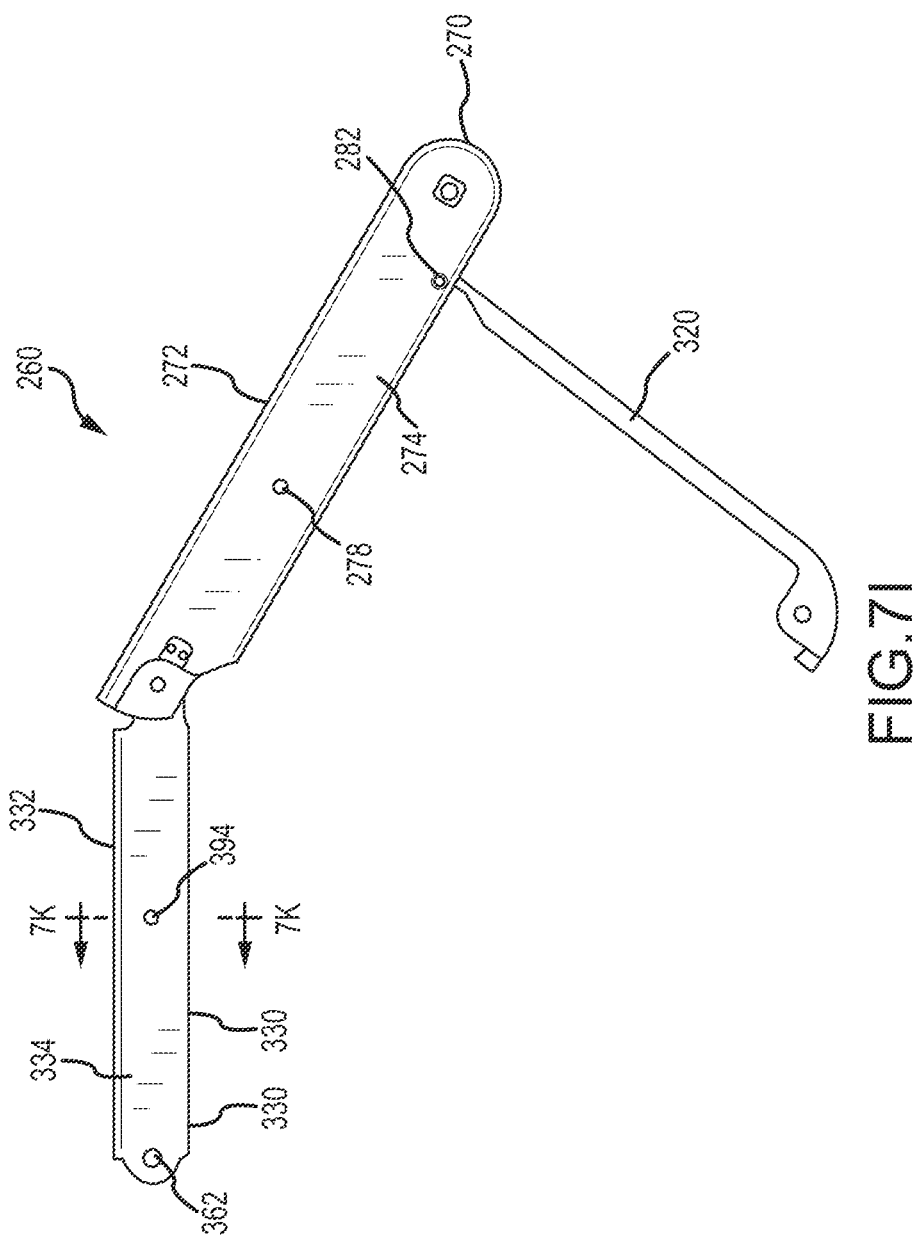
FIG. 7I is a side view of the configuration shown in FIG. 7H, in accordance with various embodiments.
Figure 7L:
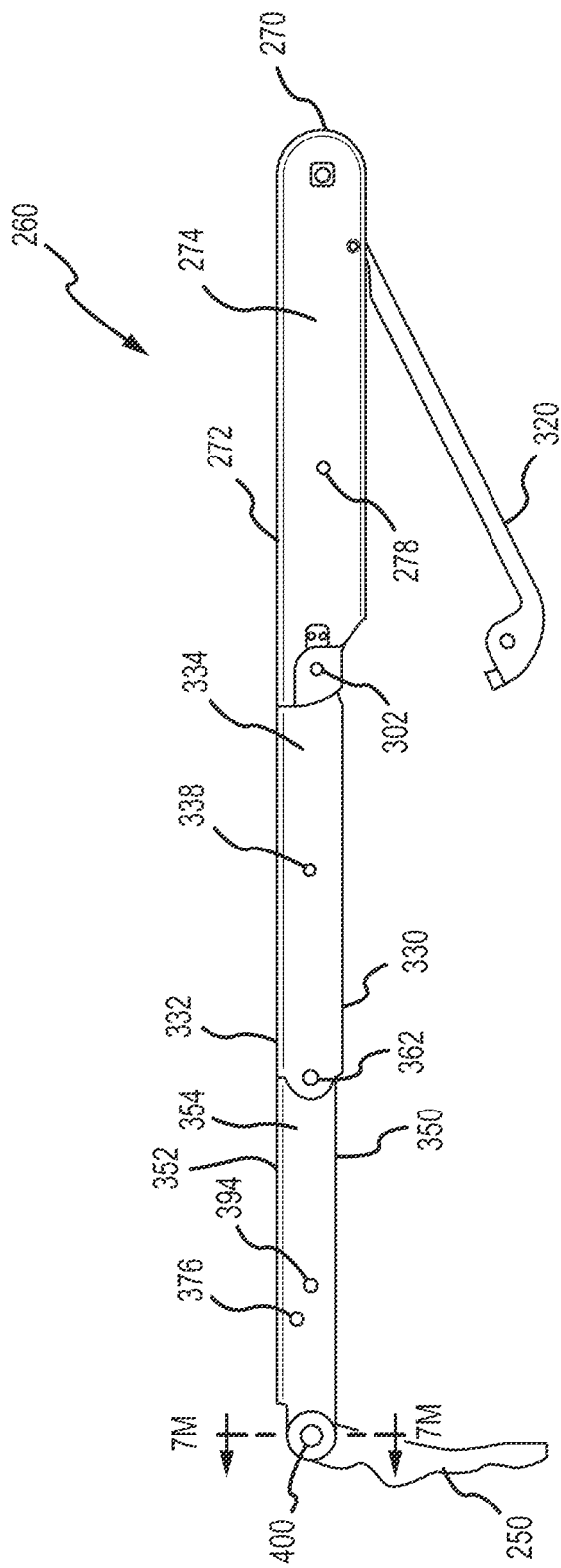
FIG. 7L is a side view of the passenger armrest assembly of FIG. 4A-4C in the extended or cargo configuration, with a distal end of the armrest assembly being anchored to a backside of a passenger seat in an adjacent, forwardly-disposed row, and prior to disposing the cover back in its closed position, in accordance with various embodiments.
Figure 7M:
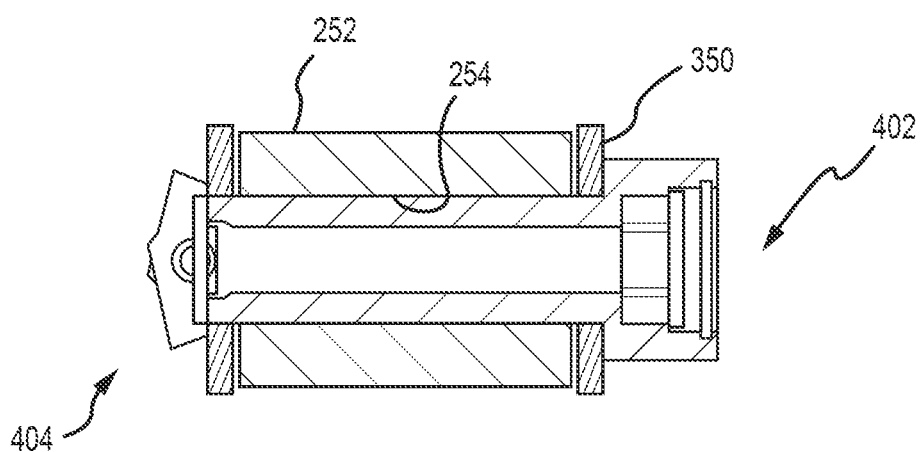
FIG. 7M is a cross-sectional view of the passenger armrest assembly shown in FIG. 7L, and taken along line 7M-7M, in accordance with various embodiments.
Figure 7N:
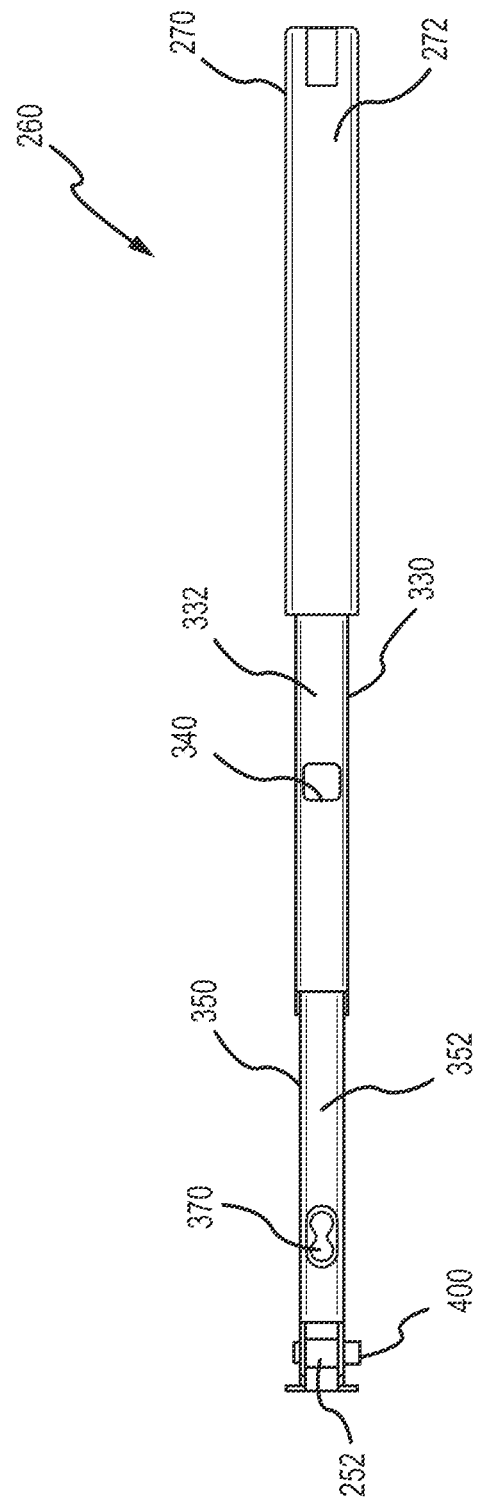
FIG. 7N is a top view of the passenger armrest assembly of FIG. 4A-4C in the FIG. 7L configuration, in accordance with various embodiments.
Figure 70:
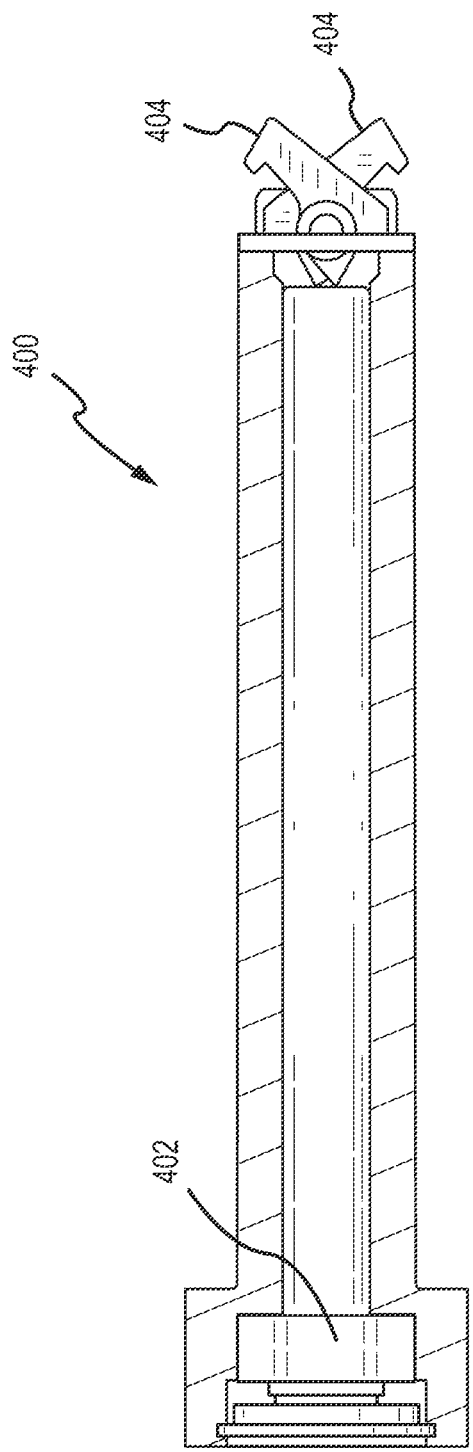
Figure 7P:
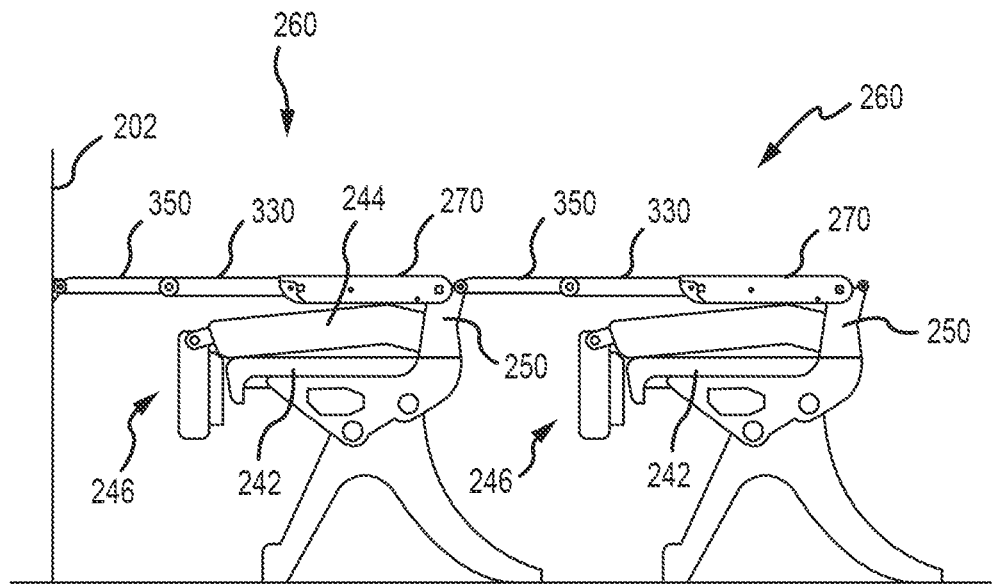
FIG. 7P is a side view of an armrest assembly of two passenger seats and two different anchoring options for their corresponding extended armrest assemblies, in accordance with various embodiments.
Figure 7Q:
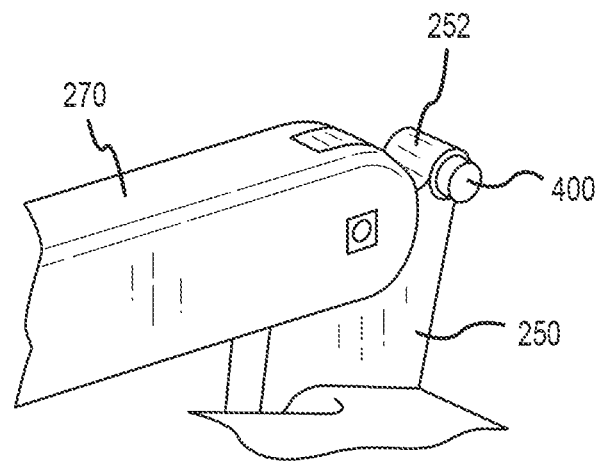
FIG. 7Q is an enlarged view of a mount on a back side of a passenger seat for detachably engaging a distal end portion of an armrest assembly of a passenger seat in an adjacent, aftly-disposed row and when this armrest assembly is in the extended or cargo configuration, in accordance with various embodiments.
Figure 7R:
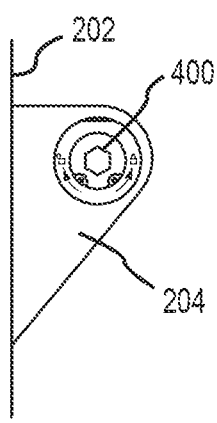
FIG. 7R is a schematic of a mounting bracket attached to a bulkhead or wall of aircraft for engaging/supporting a distal end portion of an armrest assembly of a passenger seat and when this armrest assembly is in the extended or cargo configuration, in accordance with various embodiments.
Figure 7S:
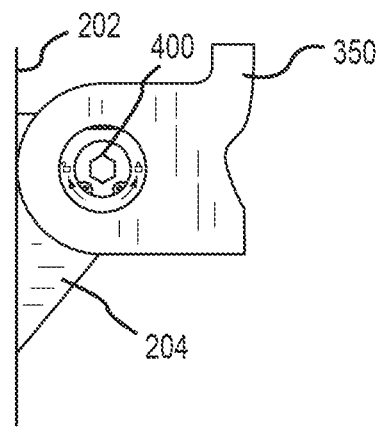
FIG. 7S is a schematic of a distal end portion of an armrest assembly of a passenger seat and when this armrest assembly is in the extended or cargo configuration and when anchored to the bracket of FIG. 7R, in accordance with various embodiments.
Figure 7T:
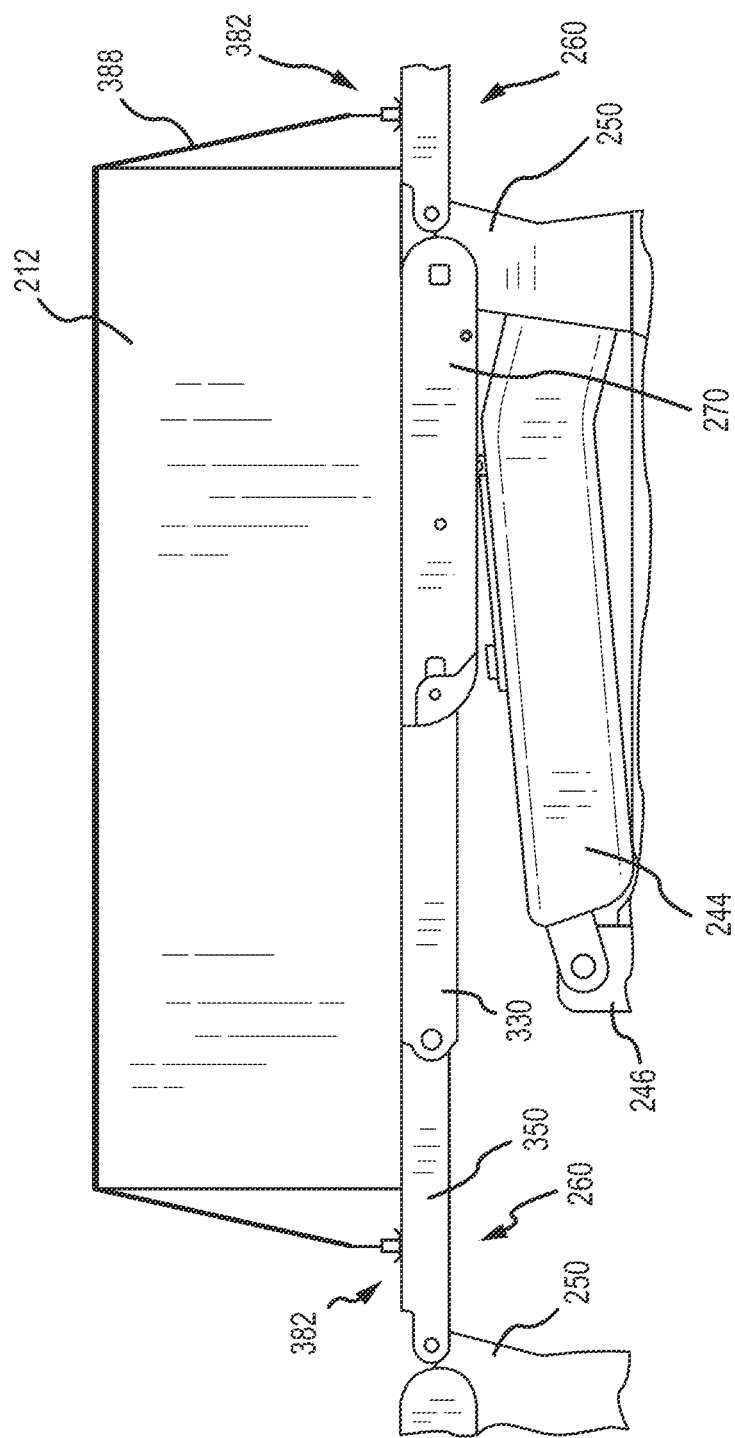
FIG. 7T is a side view of an adjacent pair of extended armrest assemblies and supporting cargo, in accordance with various embodiments.

Various of the structural and/or operational features of the armrest assembly 260 are further illustrated in FIG. 7A-7T. FIG. 7A is a side view of an armrest assembly 260 in its stowed, collapsed, or passenger configuration—the third armrest link 350 is nested within the hollow interior 336 of the second armrest link 330; the nested links 350, 330 are collectively nested within the hollow interior 276 of the first armrest link 270; the armrest links 270, 330, and 350 are retained in this position by the retention pins 394 of the retention pin assembly 390 extending through the corresponding retention pin apertures 278, 338, and 358 of the first armrest link 270, the second armrest link 330, and the third armrest link 350, respectively; and the bottom cover 320 is locked to the first armrest link 270 in the closed position for the bottom cover 320 (via the locking pins 302 of the locking pin assembly 300 each extending at least into the corresponding locking pin aperture 324 of the bottom cover 320). FIG. 7B illustrates this locked configuration for the bottom cover 320 in its closed position.

An appropriate tool may be directed through the access or pocket 326 in the bottom cover 320 (FIG. 5B), the fastener 312 of the locking pin assembly 300 may be loosened, and the tool may then be used to rotate the locking pin assembly 300 from the position shown in FIG. 7B (where the locking pins 302 at least extend into the locking pin apertures 324 of the bottom cover 320) to the position shown in FIG. 7C (where the locking pins 302 are retracted out of the locking pin apertures 324 of the bottom cover 320). At this time (the unlocked configuration—FIG. 7C), the bottom cover 320 may be pivoted or rotated relative to the first armrest link 270 and into an open position for the bottom cover 320, for instance as shown in FIG. 7D.

The third armrest link 350 remains nested within the second armrest link 330, and the nested armrest links 350, 330 remains nested within the first armrest link 270 with the bottom cover 320 being in an open position and with the locking pin assembly 300 continuing to lock the armrest links 270, 330, and 350 in the noted nested configuration, and as shown in each of FIGS. 7D and 7E (FIG. 7E showing the underside of the armrest assembly 260 in its stowed, collapsed, or passenger configuration). At this time and as shown in FIG. 7E, the upper wall 332 of the second armrest link 330 is facing or projecting in the opposite direction compared to the upper wall 272 of the first armrest link 270. A user may engage the handles 396 of the retention pin assembly 390 through the access or pocket 340 in the upper wall 332 of the second armrest link 330 to change the retention pin assembly 390 from the position shown in FIG. 7F (locked position) to the position shown in FIG. 7G (unlocked position). In FIG. 7G, the nested armrest links 330, 350 are unlocked from the first armrest link 270. The third armrest link 350 could remained locked to the second armrest link 330 by the locking pin assembly 300 as the third armrest link 350 and the second armrest link 330 are collectively rotated out of the first armrest link 270 and into the position shown in FIG. 7H (although FIG. 7G does illustrate the third armrest link 350 being unlocked from the second armrest link 330). Once the nested armrest links 330, 350 are unlocked from the first armrest link 270, and the nested armrest links 330, 350 begin to be rotated/pivoted out of the hollow interior 276 of the first armrest link 270, the handles 396 of the retention pin assembly 290 could be released such that the spring 398 of the retention pin assembly 390 would extend the retention pins 394 to lock the second armrest link 330 to the third armrest link 350. In any case, the second armrest link 330 may be pivoted or rotated out of the first armrest link 270 and into the position illustrated in FIGS. 7H and 7I. Gravitational forces may provide the entirety of the force to move the second armrest link 330 from the position shown in FIGS. 7D-7E into the position shown in FIGS. 7H-7I.

In the configuration of FIGS. 7H-7I, the second armrest link 330 extends distally from the first armrest link 270, the upper wall 332 of the second armrest link 330 and the upper wall 272 of the first armrest link 270 face or project at least generally in a common direction (e.g., upwardly), and the second armrest link 330 may remain locked to the third armrest link 350 by the retention pin assembly 390 and as shown in FIG. 7J. Again, a user may engage the handles 396 of the retention pin assembly 390 through the access or pocket 340 in the upper wall 332 of the second armrest link 330 to change the retention pin assembly 390 from the position shown in FIG. 7J to the position shown in FIG. 7K to unlock the second armrest link 330 from the third armrest link 350. The third armrest link 350 may then be pivoted or rotated out of the interior 336 of the second armrest link 330 such that the third armrest link 350 extends distally of the second armrest link 330, for instance into the configuration shown in FIG. 7L (e.g., an extended configuration or cargo configuration for the armrest assembly 260).

The proximal end/end portion of the armrest assembly 260 is supported by its corresponding armrest frame 250 and from which it extends distally for both the passenger and cargo configurations. Two options for supporting the distal or distal end section of the extended armrest assembly 260 are shown in FIG. 7P such the armrest assembly 260 is in effect a simply-supported beam (e.g., supported at two spaced locations). Each option may use an armrest assembly mounting pin 400 that is shown in FIGS. 7M and 7O and that will be briefly addressed. Generally, the armrest assembly mounting pin 400 includes an actuator 402 and a pair of locking segments 404. Rotation of the actuator 402 in one direction disposes the locking segments 404 in an unlocked configuration (where the mounting pin 400 may be removed or installed), whereas rotation of the actuator 402 in the opposite direction disposes the locking segments 404 in a locked configuration (e.g., to lock the armrest mounting pin 400 in a position where the distal end or distal end portion of an extended armrest assembly 260 is supported and cannot be removed from the supporting structure at this time).

The extended armrest assembly 260 may have its distal end or distal end section supported by an adjacent and forwardly-disposed passenger seat 240, namely its armrest frame 250 and which is shown in FIGS. 7L-7N and 7P-7Q. The backside of each armrest frame 250 may include an armrest mount 252 having a through-hole 254 extending therethrough (e.g., FIGS. 7M and 7Q). The actuator 402 of the armrest assembly mounting pin 400 be actuated to dispose its locking segments 404 in an unlocked configuration such that the armrest assembly mounting pin 400 may be pulled out of this through-hole 254, the distal end section of the extended armrest assembly 260 may be positioned relative to this armrest mount 252 such that the through-hole 254 of the armrest mount 252 is aligned with the apertures 366 through the sidewalls 354 of the third armrest link 350, and the armrest assembly mounting pin 400 may then be directed through the aperture 366 of one sidewall 354 of the third armrest link 350, through the through-hole 254 of the armrest mount 252, and through the aperture 366 of the other sidewall 354 of the third armrest link 350. The actuator 402 of the armrest assembly mounting pin 400 may then be actuated to dispose its locking segments in a locked configuration to lock the extended armrest assembly 260 to the adjacent and forwardly-disposed passenger seat 240.

A passenger seat 240 that does not have a passenger seat 240 disposed immediately in front thereof, but instead is positioned in proximity to a wall or bulkhead 202 of the aircraft 200, may have an extended armrest assembly 260 thereof supported by this bulkhead 202. In this regard and referred to FIGS. 7R and 7S, a bracket 204 may be mounted to the bulkhead 202, and this bracket 204 may include at least one through-hole such that the armrest assembly 260 can be secured to the bracket 204 by an armrest assembly mounting pin 400 in similar fashion to that discussed above in relation to the armrest mount 252 (the mounting pin 500 extending through the hole(s) in the bracket(s) 204 and through the apertures 366 in the sidewalls 354 of the third armrest link 350).

FIG. 7T presents a representative example of how cargo 212 (e.g., a container; a ULD) may be secured to at least one extended armrest assembly 260. A strap, cable, or the like 380 may extend between the tiedown assembly 382 of different armrest assemblies 260 in their extended configurations (armrest assemblies 260 in a common seat row, armrest assemblies 260 in different seat rows, or both). Although the cargo 212 could be positioned on the upper portion of only one or more of the extended armrest assemblies 260 in a common seat row, different portions of the cargo 212 could actually be disposed on the upper portion of one or more extended armrest assemblies 260 in each of multiple seat rows and as shown in FIG. 7T. As shown in FIG. 7T, the bottom cover 320 may be disposed in its closed position when/after the armrest assembly 260 has been disposed in its extended configuration.

Any feature of any other various aspects addressed in this disclosure that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular. Moreover, any failure to use phrases such as "at least one" also does not limit the corresponding feature to the singular. Use of the phrase "at least substantially," "at least generally," or the like in relation to a particular feature encompasses the corresponding characteristic and insubstantial variations thereof (e.g., indicating that a surface is at least substantially or at least generally flat encompasses the surface actually being flat and insubstantial variations thereof). Finally, a reference of a feature in conjunction with the phrase "in one embodiment" does not limit the use of the feature to a single embodiment.

The foregoing description has been presented for purposes of illustration and description. Furthermore, the description is not intended to limit the invention to the form disclosed herein. Consequently, variations and modifications commensurate with the above teachings, and skill and knowledge of the relevant art, are within the scope of the present disclosure. Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A passenger seat assembly, comprising:
   a seat bottom;
   a seat back movable relative to said seat bottom;
   a pair of armrest assemblies that are spaced from another in a dimension corresponding with a width of said seat bottom, each said armrest assembly comprising:
   a first armrest link;
   a second armrest link movably connected to said first armrest link;

a third armrest link movably connected to the corresponding said second armrest link a bottom cover movably connected with the corresponding said first armrest link; and a cover lock;

a first configuration comprising:

said seat back being disposed in an at least generally upright position relative to said seat bottom;

said second armrest link of each said armrest assembly being disposed in a stowed position relative to its corresponding said first armrest link; and for each said armrest assembly, said third armrest link being nested within the corresponding said second armrest link, and wherein said second armrest link and said third armrest link are collectively nested within the corresponding said first armrest link;

wherein said bottom cover is movably mounted to the corresponding said first armrest link and detachably engaged with the corresponding said bottom cover to retain the corresponding said armrest assembly in its said first configuration when said cover lock is disposed in a locked configuration; and a second configuration comprising:

said second armrest link of each said armrest assembly extending distally from its corresponding said first armrest link; and said third armrest link extending distally from the corresponding said second armrest link;

wherein each said armrest assembly is of a first length in said first configuration and is of a second length in said second configuration, with said second length being of a larger magnitude axially than said first length.

2. The passenger seat assembly of claim 1, wherein, for each said armrest assembly, said cover lock is movable relative to the corresponding said first armrest link to change between said locked configuration and an unlocked configuration for said cover lock, wherein said bottom cover for each said armrest assembly encloses the corresponding said second armrest link, the corresponding said third armrest link, and the corresponding said cover lock within the corresponding said first armrest link when said bottom cover is in a closed position.

3. The passenger seat assembly of claim 1, wherein said bottom cover for each said armrest assembly comprises a tool access through said bottom cover that is aligned with an activation portion of said cover lock.

4. The passenger seat assembly of claim 1, wherein each said armrest assembly further comprises a link lock mounted to one of the corresponding said second armrest link and the corresponding said third armrest link, and detachably connectable with the other of the corresponding said second armrest link and the corresponding said third armrest link.

5. The passenger seat assembly of claim 4, wherein said link lock for each said armrest assembly is disposable in each of a locked position and an unlocked position, wherein said link lock retains the corresponding said third armrest link relative to the corresponding said second armrest link when said link lock is in said locked position, wherein said link lock for each said armrest assembly further retains the corresponding said first armrest link relative to each of the corresponding said second armrest link and the corresponding said third armrest link when said link lock is in said locked position, and wherein said link lock releases the corresponding said first armrest link relative to each of the corresponding said second armrest link and the corresponding said third armrest link and further releases the corresponding said third armrest link relative to the corresponding said second armrest link when said link lock is in said unlocked position such that the corresponding said armrest assembly may be disposed in said second configuration.

6. An aircraft comprising the passenger seat assembly of claim 1, further comprising a second passenger seat assembly disposed in front of and spaced from said passenger seat assembly, wherein a distal end section of each said armrest assembly is detachably anchored to said second passenger seat assembly when said pair of armrest assemblies are in said second configuration.

7. An aircraft comprising the passenger seat assembly of claim 1, further comprising a wall disposed in front of and spaced from said passenger seat assembly, and at least two brackets fastened to said wall, wherein a distal end section of each said armrest assembly of said passenger seat assembly is detachably anchored to a different one of said brackets when said pair of armrest assemblies are in said second configuration.

8. An armrest assembly for a passenger seat assembly, comprising:

a first armrest link;

a second armrest link movably connected with said first armrest link;

a third armrest link movably connected with said second armrest link;

a bottom cover movably connected with said first armrest link;

a cover lock;

a first configuration where said third armrest link is nested within said second armrest link and where said second and third armrest links are collectively nested within said first armrest link; and a second configuration where said second armrest link extends distally from said first armrest link and where said third armrest link extends distally from said second armrest link;

wherein said cover lock is movably mounted to said first armrest link and detachably engaged with said bottom cover to retain said armrest assembly in said first configuration when said cover lock is disposed in a locked configuration, and wherein said armrest assembly is of a first length in said first configuration and said armrest assembly is of a second length in said second configuration, with said second length being of a larger magnitude axially than said first length.

9. The armrest assembly of claim 8, wherein said cover lock is movable relative to said first armrest link to change between said locked configuration and an unlocked configuration for said cover lock, and wherein said bottom cover encloses said second armrest link, said third armrest link, and said cover lock within said first armrest link when said bottom cover is in a closed position.

10. The armrest assembly of claim 8, wherein said bottom cover comprises a tool access through said bottom cover that is aligned with an activation portion of said cover lock.

11. The armrest assembly of claim 8, further comprising:

a link lock mounted to one of said second armrest link and said third armrest link, and detachably connectable with the other of said second armrest link and said third armrest link, wherein said link lock is disposable in each of a locked position and an unlocked position, wherein said link lock retains said third armrest link relative to said second armrest link when said link lock is in said locked position, wherein said link lock further retains said first armrest link relative to each of said second armrest link and said third armrest link when said link lock is in said locked position, and wherein said link lock releases said first armrest link relative to each of said second armrest link and said third armrest link and further releases said third armrest link relative to said second armrest link when said link lock is in said unlocked position such that said armrest assembly may be disposed in said second configuration.

12. A method of converting at least part of a passenger compartment between a first configuration to a second configuration, comprising the steps of:

disposing a plurality of armrest assemblies in a common row of passenger seats configured in said passenger compartment, wherein each said armrest assembly comprises a bottom cover;

moving each said bottom cover into an open position; and extending said plurality of armrest assemblies from a stowed axial configuration to an extended axial configuration, and wherein each armrest assembly of said plurality of armrest assemblies is longer in said extended axial configuration compared to said stowed axial configuration.

13. The method of claim 12, wherein said extending for each said armrest assembly comprises pivoting a second armrest link relative to a first armrest link, wherein for each said armrest assembly said second armrest link extends distally from said first armrest link for said extended axial configuration, wherein said extending for each said armrest assembly further comprises pivoting a third armrest link relative to said second armrest link, and wherein for each said armrest assembly said third armrest link extends distally from said second armrest link for said extended axial configuration.

14. The method of claim 12, wherein said moving said bottom cover comprises requiring a tool to first unlock said bottom cover relative to the corresponding said armrest assembly.

15. The method of claim 12, further comprising one of for each said armrest assembly:

supporting a distal end section of said armrest assembly with an adjacent row of passenger seats; or supporting a distal end section of said armrest assembly with a corresponding bracket attached to a wall.

16. The method of claim 12, further comprising moving each said armrest assembly distally from said extended axial configuration to said stowed axial configuration.

* * * * *